United States Patent
Chigusa

(10) Patent No.: US 9,313,354 B2
(45) Date of Patent: Apr. 12, 2016

(54) OUTPUT SYSTEM FOR SECURE IMAGE PROCESSING, IMAGE PROCESSING APPARATUS, AND OUTPUT METHOD THEREOF

(71) Applicant: Yoshinari Chigusa, Kanagawa (JP)

(72) Inventor: Yoshinari Chigusa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 64 days.

(21) Appl. No.: 13/798,340

(22) Filed: Mar. 13, 2013

(65) Prior Publication Data
US 2013/0250330 A1 Sep. 26, 2013

(30) Foreign Application Priority Data

Mar. 22, 2012 (JP) .................................. 2012-065105
Dec. 26, 2012 (JP) .................................. 2012-283373

(51) Int. Cl.
G06F 3/12 (2006.01)
H04N 1/00 (2006.01)
(Continued)

(52) U.S. Cl.
CPC ........ *H04N 1/00925* (2013.01); *H04N 1/00973* (2013.01); *H04N 1/34* (2013.01); *H04N 1/4413* (2013.01); *H04N 1/4426* (2013.01); *H04N 1/4433* (2013.01)

(58) Field of Classification Search
CPC ... G06F 21/606; G06F 21/608; G06F 3/1204; G06F 3/1222; G06F 3/1228; G06F 3/1238; G06F 3/1247; G06F 3/1268; G06F 3/1288; G06F 3/1292; H04N 1/00925; H04N 1/00973; H04N 1/4413; H04N 1/4426; H04N 1/4433; H04N 2201/3205; H04N 1/00137; H04N 1/00244; H04N 1/00307; H04N 1/33307; H04N 1/4406; H04N 1/00474; H04N 2201/0094; H04N 2201/3278; H04N 1/973; H04N 1/34

USPC .............................. 358/1.13, 1.15, 1.14, 1.16
See application file for complete search history.

(56) References Cited

U.S. PATENT DOCUMENTS 7,827,285 B2 * 11/2010 Terada .......................... 358/1.15
8,305,601 B2 * 11/2012 Kawai .......................... 358/1.15
(Continued)

FOREIGN PATENT DOCUMENTS

JP 2003-167694 6/2003
JP 2003-242239 8/2003
(Continued)

OTHER PUBLICATIONS

English Machine Translation of JP-2006-134046-A (Mitsunori, Published May 25, 2006).*

*Primary Examiner* — Benny Q Tieu
*Assistant Examiner* — Juan M Guillermety
(74) *Attorney, Agent, or Firm* — Harness, Dickey & Pierce, P.L.C.

(57) ABSTRACT

An output system includes an identification information registration unit configured to register identification information of a terminal device; a transmission unit configured to transmit output data for settings to the terminal device, the output data for settings including the identification information; a determination unit configured to determine whether the identification information obtained by a first communication unit is equal to the identification information included in the output data for settings; an available terminal registration unit configured to register the terminal device as an available terminal device, if the determination unit determines that the identification information obtained is equal to the identification information included in the output data for settings; and an output control unit configured to output the output data received by the first communication unit from the terminal device registered as the available terminal.

8 Claims, 12 Drawing Sheets

(51) Int. Cl.
*H04N 1/34* (2006.01)
*H04N 1/44* (2006.01)

(56) References Cited

U.S. PATENT DOCUMENTS

| | | | |
|---|---|---|---|
| 8,914,479 B2* | 12/2014 | Parks et al. | 358/1.15 |
| 2005/0180793 A1 | 8/2005 | Nishiguchi | |
| 2006/0123114 A1* | 6/2006 | Aoki et al. | 709/226 |
| 2007/0165276 A1* | 7/2007 | Nakashima | 358/1.15 |
| 2007/0263022 A1 | 11/2007 | Chigusa | |
| 2008/0030780 A1* | 2/2008 | Izawa | 358/1.16 |
| 2009/0036056 A1* | 2/2009 | Oshima et al. | 455/41.3 |
| 2009/0296150 A1* | 12/2009 | Shudo | 358/1.15 |
| 2009/0316197 A1 | 12/2009 | Chigusa | |
| 2010/0149577 A1* | 6/2010 | Kamasuka | 358/1.13 |
| 2010/0309510 A1* | 12/2010 | Hansen | 358/1.15 |
| 2011/0149324 A1* | 6/2011 | Kuwahara | 358/1.13 |
| 2011/0188080 A1 | 8/2011 | Chigusa | |
| 2011/0261402 A1* | 10/2011 | Yamamoto | 358/1.15 |
| 2011/0286029 A1* | 11/2011 | Kadowaki | 358/1.14 |
| 2012/0147420 A1* | 6/2012 | Nishimi et al. | 358/1.15 |
| 2012/0216250 A1 | 8/2012 | Chigusa | |
| 2012/0218589 A1* | 8/2012 | Watanabe et al. | 358/1.15 |

FOREIGN PATENT DOCUMENTS

| | | |
|---|---|---|
| JP | 2003-242240 | 8/2003 |
| JP | 2005-228148 | 8/2005 |
| JP | 2006-134046 | 5/2006 |
| JP | 2006-350917 | 12/2006 |

* cited by examiner

FIG.5

EXAMPLE OF METADATA OUT OF PDF FILE FOR SETTINGS

```
<x:xmpmeta xmlns:x="adobe:ns:meta/" x:xmptk="3.1-702">
  <rdf:RDF xmlns:rdf="http://www.w3.org/1999/02/22-rdf-syntax-ns#">
    <rdf:Description rdf:about=""
          xmlns:pdf="http://ns.adobe.com/pdf/1.3/">
      <pdf:Producer>Acrobat Distiller 7.0.5 (Windows)</pdf:Producer>
      <pdf:Keywords>MAC="00:26:08:AA:AA:AA"; User="Y.Chigusa"; CID=012345ABCD;     ⎫
PrintSetting="Color; 2in1; Duplex"; LimitPage=1000</pdf:Keywords>                  ⎬ A
    </rdf:Description>                                                              ⎭
    <rdf:Description rdf:about=""
          xmlns:xap="http://ns.adobe.com/xap/1.0/">
      <xap:CreateDate>2012-02-01T11:57:23+09:00</xap:CreateDate>
      <xap:CreatorTool>PScript5.dll Version 5.2.2</xap:CreatorTool>
      <xap:ModifyDate>2012-02-01T12:51:39+09:00</xap:ModifyDate>
      <xap:MetadataDate>2012-02-01T12:51:39+09:00</xap:MetadataDate>
    </rdf:Description>
    <rdf:Description rdf:about=""
          xmlns:xapMM="http://ns.adobe.com/xap/1.0/mm/">
      <xapMM:DocumentID>uuid:68f3fb86-402a-4702-86f8-c13764055b19</xapMM:DocumentID>
      <xapMM:InstanceID>uuid:36f31353-1bce-4de7-9256-88678bd700aa</xapMM:InstanceID>
    </rdf:Description>
    <rdf:Description rdf:about=""
          xmlns:dc="http://purl.org/dc/elements/1.1/">
      <dc:format>application/pdf</dc:format>
      <dc:title>
        <rdf:Alt>
          <rdf:li xml:lang="x-default">Simple Print Service</rdf:li>
        </rdf:Alt>
      </dc:title>
      <dc:creator>
        <rdf:Seq>
          <rdf:li>chigusa</rdf:li>
        </rdf:Seq>
      </dc:creator>
      <dc:subject>
        <rdf:Bag>
          <rdf:li>MAC="00:26:08:AA:AA:AA"</rdf:li>   ⎫
          <rdf:li>User="Y.Chigusa"</rdf:li>          ⎪
          <rdf:li>CID=012345ABCD</rdf:li>            ⎪
          <rdf:li>PrintSetting="Color</rdf:li>       ⎬ B
          <rdf:li>2in1</rdf:li>                      ⎪
          <rdf:li>Duplex"</rdf:li>                   ⎪
          <rdf:li>LimitPage=1000</rdf:li>            ⎭
        </rdf:Bag>
      </dc:subject>
    </rdf:Description>
  </rdf:RDF>
</x:xmpmeta>
```

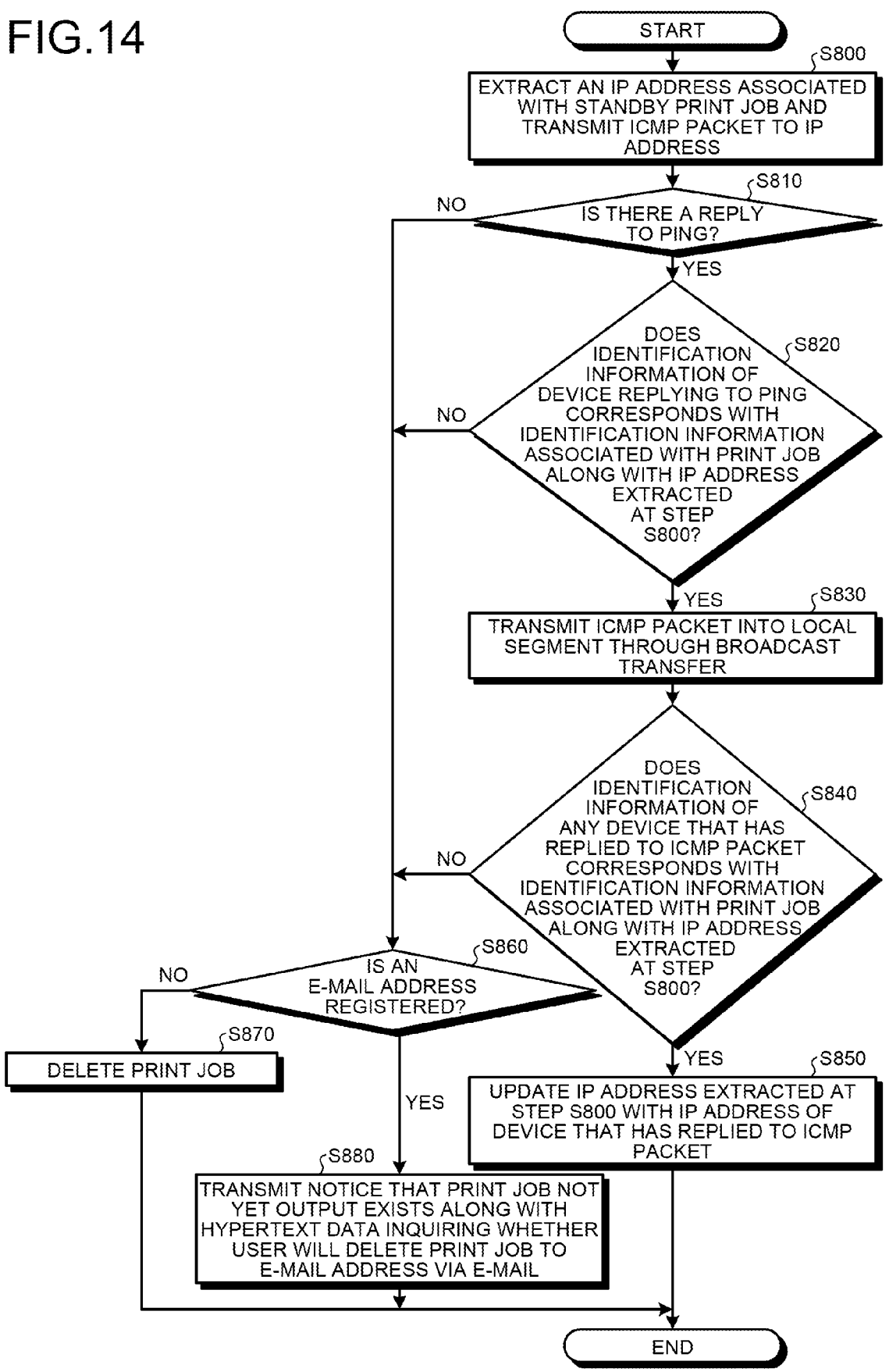

OUTPUT SYSTEM FOR SECURE IMAGE PROCESSING, IMAGE PROCESSING APPARATUS, AND OUTPUT METHOD THEREOF

CROSS-REFERENCE TO RELATED APPLICATIONS

The present application claims priority to and incorporates by reference the entire contents of Japanese Patent Application No. 2012-065105 filed in Japan on Mar. 22, 2012 and Japanese Patent Application No. 2012-283373 filed in Japan on Dec. 26, 2012.

BACKGROUND OF THE INVENTION

1. Field of the Invention

The present invention relates to an output system, an image processing apparatus, and an output method.

2. Description of the Related Art

Conventional public printing services are known in which users operate a terminal to use a printing device installed in a public place to execute printing. In such public printing services, a prepaid system and a credit card transaction system are developed for a method for charging printing fees.

With the prepaid system, users can perform printing within a limitation of the fee the user has preliminarily paid at a shop, for example. With the credit card transaction system, the credit card number is used for transaction.

The technologies relating to these public printing services are disclosed in Japanese Patent Application Laid-open No. 2003-167694, Japanese Patent Application Laid-open No. 2006-134046, Japanese Patent Application Laid-open No. 2003-242239, and Japanese Patent Application Laid-open No. 2003-242240.

Japanese Patent Application Laid-open No. 2006-134046 discloses an example of a public printing system with a prepaid system. This public printing system includes a charge information processing apparatus, an information processing apparatus, and a printing device. The charge information processing apparatus manages the number of output for printing available according to the amount preliminarily paid. The information processing apparatus generates printing data that can be output from the printing device and transmits the printing data. The printing device executes printing output.

Japanese Patent Application Laid-open No. 2006-134046 further discloses that when the information processing apparatus transmits printing data to the printing device, the information processing apparatus adds a job ID to the printing data. When the user inputs the job ID in the printing device, the printing data corresponding to the job ID is printed. Japanese Patent Application Laid-open No. 2006-134046 also discloses that, for print execution, a user inputs authentication key that has been notified when the user pays a fee so that the printing device accesses the charge information processing apparatus according to the authentication key. The printing device checks the remaining printable number of times and executes the printing if the printable number of times remains.

In addition to the examples above, the public printing services with a prepaid system include a publicly known system in which a print processing program with information of the fee already paid is distributed.

Furthermore, as a system for ordering printing from a portable terminal to a printer, a technology referred to as driverless printing is also publicly known. With the driverless printing, a user can order printing without installing a driver specific to the printer, which is provided by a printer vendor.

In the public printing services describes above, the printing device has to receive a printing request from various users (or apparatuses). Upon receipt of the requests or execution of printing, it is important to determine whether the printing device can comply with the request, that is to say, whether the user is authorized to use the apparatus.

Various methods for such authentication are disclosed in the patent documents described above, for example, and are publicly known. In the conventional methods, however, it is assumed that a driver specific to the printing device (the driver with a specific function to work with the printing device) is installed in the terminal that requests the printing device of printing. To use the printing device, the driver needs to be installed in the terminal in advance, thereby bothering the user with this installing operation.

Also from the viewpoint of a vendor of the printing device, the vendor needs to provide a system for distributing the driver, which increases the cost of the printing device. Even though the printing device employs the above-described driverless printing, which eliminates distribution of a specific driver, the terminal cannot always execute the processing intended by the vendor through the driverless printing. In addition, conventionally known technologies have not yet provided a method to sufficiently perform user authentication when printing is ordered from the terminal through driverless printing.

Furthermore, conventional methods request users to input certain information in the printing device for user authentication. For example, Japanese Patent Application Laid-open No. 2006-134046 described above discloses a technology in which a user needs to input a job ID and an authentication key in the printing device to enable the printing device to execute printing.

This input provides an advantageous effect to prevent a printout from being taken away by persons other than the user that has requested the printing. However, users sometimes order printing in the immediate vicinity of the printing device, that is, users need not to worry that the printouts will be taken away. In such a case, if users are required to always input information for authentication, the operability of the printing device decreases.

The problems described above also occur if the request by the user through the terminal is the output other than printing, e.g., display or projection of information. In other words, the same problems occur if the apparatus is a display device or a projector rather than a printing device.

Therefore, there is a need to enable a user to authenticate the user itself by operating the terminal in a simple manner when using an output device.

SUMMARY OF THE INVENTION it is an object of the present invention to at least partially solve the problems in the conventional technology.

According to an embodiment, there is provided an output system that includes a first communication unit configured to obtain identification information for identifying a terminal device and receive output data from the terminal device; an output unit configured to perform an output process on the output data received by the first communication unit; a second communication unit configured to obtain identification information for identifying the terminal device; an identification information registration unit configured to register identification information of the terminal device when the second communication unit receives a request to register the identification information from the terminal device; a transmission unit configured to transmit output data for settings to the terminal device, the output data for settings including the identification information of the terminal device registered by the identification information registration unit; a determination unit configured to determine whether the identification information obtained by the first communication unit when the first communication unit receives the output data for settings as the output data from the terminal device is equal to the identification information included in the output data for settings; an available terminal registration unit configured to register the terminal device as an available terminal device, if the determination unit determines that the identification information obtained by the first communication unit is equal to the identification information included in the output data for settings; and an output control unit configured to control the output unit to output the output data received by the first communication unit from the terminal device registered as the available terminal by the available terminal registration unit.

According to another embodiment, there is provided an image processing apparatus that includes a first communication unit configured to obtain identification information for identifying a terminal device and receive output data from the terminal device; an output unit configured to perform an output process on the output data received by the first communication unit; a determination unit configured to determine whether the identification information obtained by the first communication unit when the first communication unit receives the output data for settings as the output data from the terminal device is equal to the identification information included in the output data for settings; an available terminal registration unit configured to register the terminal device as an available terminal device, if the determination unit determines that the identification information obtained by the first communication unit is equal to the identification information included in the output data for settings; and an output control unit configured to control the output unit to output the output data received by the first communication unit from the terminal device registered as the available terminal by the available terminal registration unit.

According to still another embodiment, there is provided an output method that includes obtaining identification information for identifying a terminal device and receiving output data from the terminal device; further obtaining identification information for identifying the terminal device; registering identification information of the terminal device when a request to register the identification information is received from the terminal device; transmitting output data for settings to the terminal device, the output data for settings including the identification information of the terminal device registered at the registering the identification information; determining whether the identification information obtained when the output data for settings is received as the output data from the terminal device is equal to the identification information included in the output data for settings; registering the terminal device as an available terminal device, if it is determined that the identification information obtained is equal to the identification information included in the output data for settings; and performing an output process on the output data received from the terminal device registered as the available terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of metadata out of the output data for settings illustrated in FIG. 4;

FIG. 14 is a flowchart of an example of processing performed by a job management unit.

DETAILED DESCRIPTION OF THE PREFERRED EMBODIMENTS

Embodiments according to the present invention are described below in detail with reference to the accompanying drawings.

First Embodiment

Figure 1:
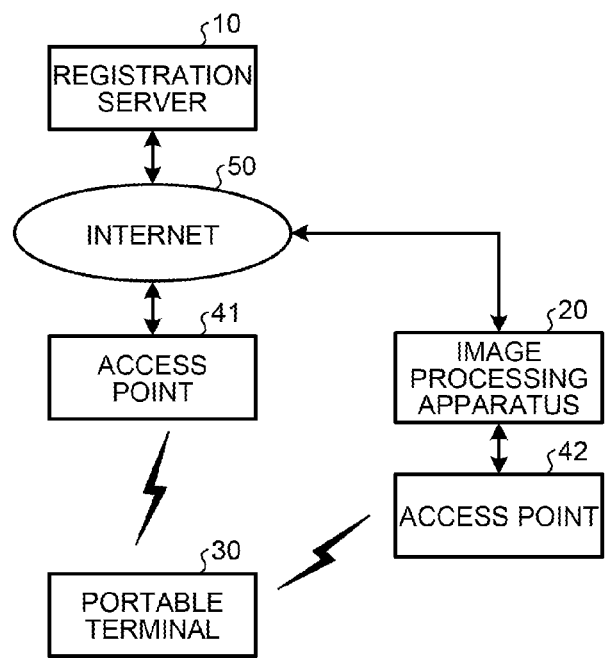
FIG. 1 is a diagram illustrating a use form of an output system and an image processing apparatus according to an embodiment of the present invention.

FIG. 1 is a diagram illustrating a use form of an output system and an image processing apparatus according to an embodiment of the present invention.

An output system in the structure illustrated in FIG. 1 includes a registration server 10 and an image processing apparatus 20, which can communicate with each other through the Internet 50.

The registration server 10, which will be described in detail later, is an apparatus that receives registration of a terminal for using an output system. The registration server 10 provides the terminal with output data for settings including at least identification information of the terminal as data representing that the terminal is registered in the registration server 10. The output data for settings is provided in the same format as the output data used for requesting an image output from the terminal to the image processing apparatus.

The image processing apparatus 20 outputs an image upon a request by a user. The image processing apparatus 20 is described here as a printing device such as a printer that outputs a printed image. The image processing apparatus 20 may be, however, a display apparatus such as a display unit that outputs a displayed image or a projection apparatus such as a projector that outputs a projected image. The image processing apparatus 20 outputs the requested output only after receiving the request from the terminal that is confirmed to be registered in the registration server 10 through the output data for settings described above.

A portable terminal 30 is operated by a user using the output system. The portable terminal 30 is wirelessly coupled to the Internet 50 through an access point 41 of a wireless local area network (LAN) so as to communicate with the registration server 10 and the image processing apparatus 20 through the Internet 50. The portable terminal 30 can communicate with the image processing apparatus 20 also through an access point 42, not through the Internet 50. The access point 42 may be included in the image processing apparatus 20 or may be coupled to the image processing apparatus 20 through a local area network (LAN).

When a user makes the image processing apparatus 20 perform an intended output, the user operates the portable terminal 30 to access the registration server 10 for registration, and obtains the output data for settings representing the registration from the registration server 10. The user subsequently transmits the output data for settings to the image processing apparatus 20 for confirmation that the user is already registered in the registration server 10. After that, the user transmits output data to the image processing apparatus 20 for output, the user enables the image processing apparatus 20 to perform output according to the output data.

Figure 2:
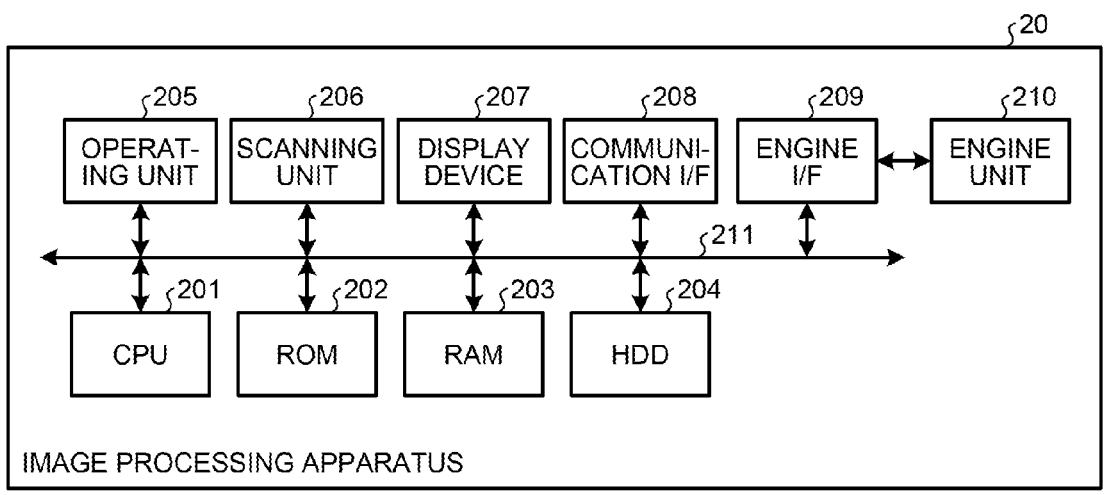
FIG. 2 is a diagram illustrating the hardware structure of the image processing apparatus illustrated in FIG. 1.

FIG. 2 illustrates the hardware structure of the image processing apparatus 20.

As illustrated in FIG. 2, the image processing apparatus 20 includes a CPU 201, a ROM 202, a RAM 203, a hard disk drive (HDD) 204, an operating unit 205, a scanning (reading) unit 206, a display device 207, a communication interface (I/F) 208, and an engine I/F 209, which are coupled to each other through a system bus 211. The engine I/F 209 is also coupled to an engine unit 210.

The CPU 201, out of these components, is a controller for controlling the image processing apparatus 20 totally. The CPU 201 also reads out a program stored in the ROM 202 or the HDD 204, then executes the program to control the components of the image processing apparatus 20, whereby various functions such as a second communication unit, a setting unit, and an output unit, which will described later, can be implemented.

The ROM 202 is a non-volatile storage unit that stores therein a program executed by the CPU 201.

The RAM 203 is a storage unit used as a working area where the program to be executed by the CPU 201 is loaded and various types of processing are performed.

The HDD 204 is a mass storage unit that stores therein a program to be executed by the CPU 201 or various types of data to be processed by the CPU 201.

The operating unit 205 is a part for receiving operations from a user, and includes keys, switches, or a touch panel laminated on the display device 207. An external mouse or keyboard may be employed for the operating unit 205.

The scanning unit 206 includes an image reading unit, which has a function to read an image of a code symbol placed in a scanning area in the image reading unit and decode the code symbol. The image of a code symbol may be displayed on a display.

The display device 207 is a display unit that displays information for a user, which includes a display panel or a lamp.

The communication I/F 208 is an interface for communicating with an external device through a network. Any interface may be used as long as it complies with the communication protocol used. The access point 42 may be provided so as to communicate with the external device through the communication I/F 208, or may be embedded in the image processing apparatus 20 as a part of the communication I/F 208.

The engine I/F 209 is an interface for enabling the CPU 201 to control the engine unit 210.

The engine unit 210 is an output unit for performing a physical output other than a communication output to outside of the image processing apparatus 20. When the image processing apparatus 20 is a printer, the engine unit 210 includes an image forming unit that forms an image on a sheet.

The registration server 10 can use, as hardware, a publicly known computer that includes a CPU, a ROM, a RAM, an HDD, and a communication I/F, thus illustration of the registration server 10 is omitted. The portable terminal 30 can also use, as hardware, a publicly known communication apparatus that includes a CPU, a ROM, a RAM, an HDD, and a communication I/F, thus illustration of the portable terminal 30 is omitted. For example, a smartphone or a tablet terminal may be used as a portable terminal 30. Other devices including other functions, such as a game machine and a music reproducing apparatus may also be used as a portable terminal 30, as long as the device includes a communication function that communicates with the registration server 10 and the image processing apparatus 20 and performs processing described later.

One of characteristics of the output system with the above-described structure is a method performed by the image processing apparatus 20 for determining whether the portable terminal 30 accessing the image processing apparatus 20 is registered in the registration server 10. Functions and processing provided with or performed by the registration server 10, the image processing apparatus 20, and the portable terminal 30, relating to this method will be described below.

Figure 3:
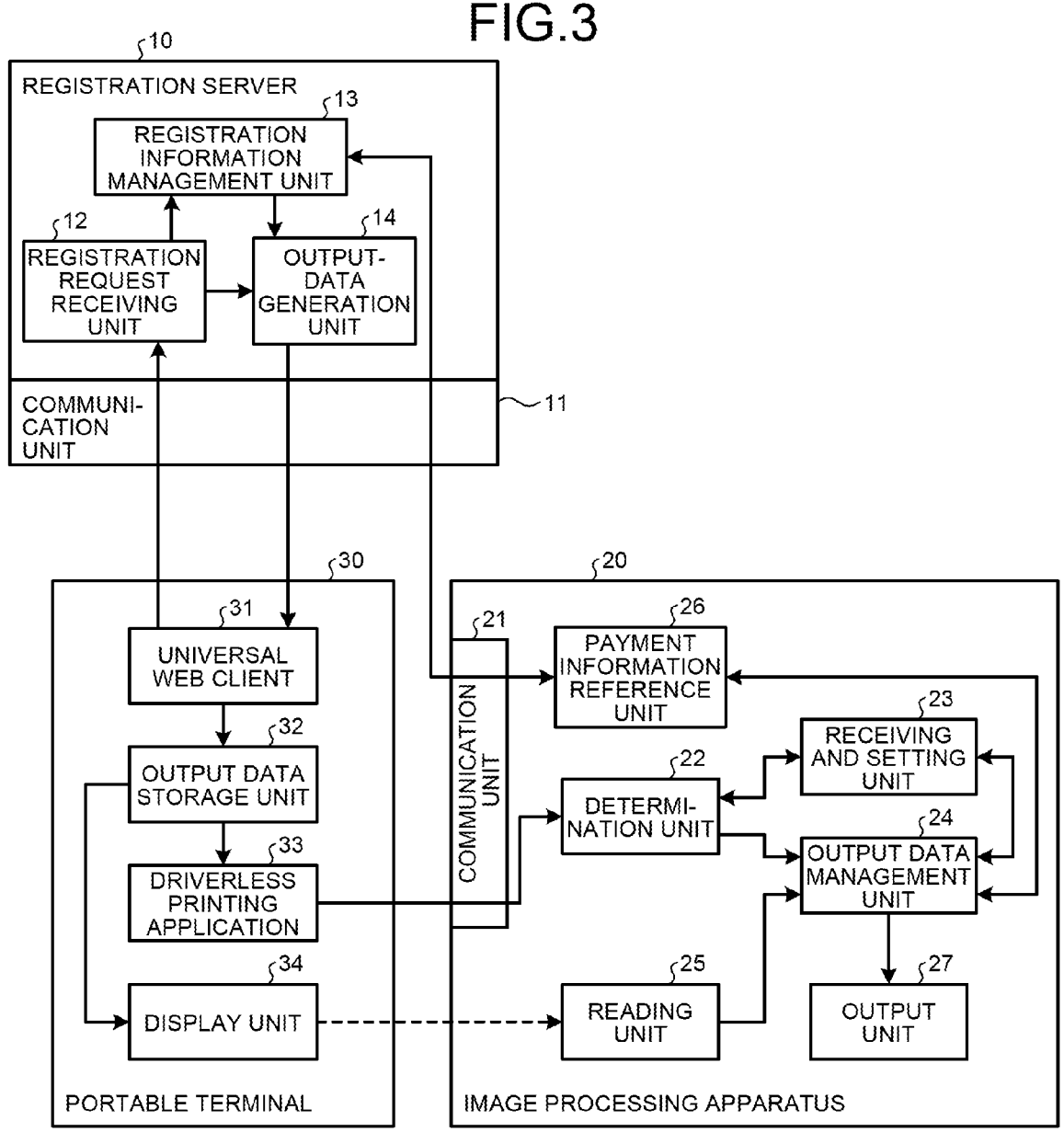
FIG. 3 is a diagram illustrating the function structure of a registration server, the image processing apparatus, and a portable terminal illustrated in FIG. 1.

FIG. 3 illustrates the function structure of the registration server 10, the image processing apparatus 20, and the portable terminal 30 illustrated in FIG. 1. In FIG. 3, the functions relating to the above-described characteristic are mainly illustrated. As illustrated in FIG. 3, the registration server 10 includes a communication unit 11, a registration request receiving unit 12, a registration information management unit 13, and an output-data generation unit 14. The image processing apparatus 20 includes a communication unit 21, a determination unit 22, a receiving and setting unit 23, the output data management unit 24, a reading unit 25, a payment information reference unit 26, and an output unit 27. The portable terminal 30 includes a universal web client 31, an output data storage unit 32, a driverless printing application 33, and a display unit 34.

The CPUs in the registration server 10, the image processing apparatus 20, and the portable terminal 30 execute necessary programs so as to control the operations of the hardware in the corresponding apparatus or the like, thereby implementing the functions of the components described above.

The universal web client 31 in the portable terminal 30 is a web client application provided in the portable terminal 30 before shipment, an example of which is a typical web browser. The driverless printing application 33 is also a typical application basically provided in the portable terminal 30 before shipment. An example of the driverless printing application 33 may be an application for implementing the function of AirPrint (registered trademark) offered by Apple.

The functions of the universal web client 31 and the driverless printing application 33, which will be described below, are usually expected to be included in the applications before shipment, without being added through add-on.

The communication unit 11 of the registration server 10 has a function to communicate with the universal web client 31 of the portable terminal 30. The communication unit 11 also has a function, at least when communicating with the portable terminal 30, to obtain identification information such as the address that identifies the other party from the other party's device (the portable terminal 30) during the communication. In other words, the communication unit 11 communicates with the other party using a communication protocol with which the identification information can be obtained.

Examples for the obtained identification information are a media access control (MAC) address and a universally unique identifier (the UUID). These types of identification information can also be obtained by using a hypertext transfer protocol (HTTP) or a hypertext transfer protocol over secure socket layer (HTTPS), which are typically available in the universal web client 31.

The registration request receiving unit 12 has a function to receive a registration request transmitted from the universal web client 31. As necessary, the registration request receiving unit 12 also has a function to receive various types of input such as payment information for charging, a functional limitation in the output system (limitation of output), and settings for output used in the image processing apparatus 20. The registration request receiving unit 12 obtains the identification information of the portable terminal 30 that has been obtained by the communication unit 11 when communicating with the universal web client 31 (e.g., in a communication relating to receiving the registration request). When the portable terminal 30 is registered, the registration request receiving unit 12 provides the information that have been received and obtained to the registration information management unit 13 and the output-data generation unit 14. Some sort of verification may be made in relation to determination whether the registration is performed upon the request.

The registration information management unit 13 stores therein the identification information of the portable terminal 30, the payment information, information on terms of use that represents the limitation of output, and setting information that represents settings for output, associated with each other, according to the information provided from the registration request receiving unit 12. Examples for the payment information are the amount paid in a prepaid system (the remaining amount, if used) or a credit card number used for credit card transactions.

The registration information management unit 13 has a function to determine whether the output to be executed in the image processing apparatus 20 is permissible within the payment limitation according to the registered payment information, in response to a query by the payment information reference unit 26 of the image processing apparatus 20, and a function to provide the determination result to the payment information reference unit 26. The determination whether the output is permissible is made depending on, for example, whether the output can be executed within the remaining amount of prepaid fees, or whether a necessary charge for executing the output can be made to a credit card.

In addition to the determination result of the permission, information on terms of use or the setting information may be provided to the payment information reference unit 26.

When the portable terminal 30 is registered in the registration server 10, the output-data generation unit 14 generates output data for settings, as data presenting the registration, including at least the identification information of the portable terminal 30 provided by the registration request receiving unit 12, and transmits the data for settings to the portable terminal 30, which has requested the registration. The output data for settings may include information on terms of use and the setting information in addition to the identification information, it is recommended that the payment information (information for credit card transactions, in particular) is excluded, from the viewpoint of confidentiality.

In the portable terminal 30, the universal web client 31 receives the output data for settings and stores it in the output data storage unit 32. This may be manually operated by a user. The output data for settings is provided as data in the same format as the data representing the printing content (output content) transmitted by the portable terminal 30 through the driverless printing application 33 to the image processing apparatus 20 for ordering printing. In other words, the data is in a format that can be recognized as data representing print content by the image processing apparatus 20. That to say, the output data for settings is also the output data representing the content of output to be executed by the image processing apparatus 20.

It is preferred that the output data for settings and the output data be data in a generic format that can be supported by standard application programs typically installed before shipment in various types of mass-produced apparatuses e.g., the portable terminal 30. In view of the circumstances above, the output data for settings (and the output data) may be, for example, document data in the portable document format (PDF) or image data in the joint photographic experts group (JPEG) format.

This enables a user of the portable terminal 30 to transmit the output data for settings to the image processing apparatus 20 using exactly the same operation when ordering the image processing apparatus 20 to print through the driverless printing application 33, by simply selecting the output data for settings as the data to be printed.

Figure 4:
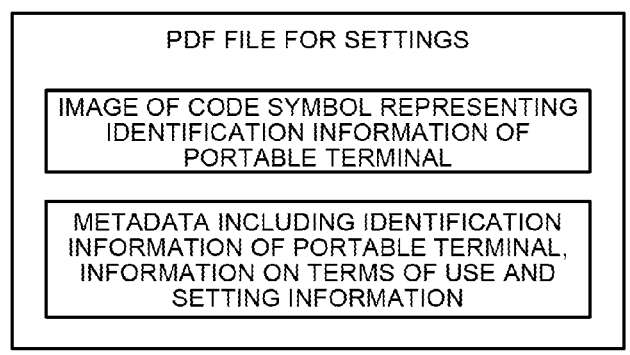
FIG. 4 is a diagram illustrating an example of the structure of output data for settings in the portable document format (PDF)

FIG. 4 illustrates an example of the structure of the output data for settings in the PDF (a PDF file for settings) and FIG. 5 illustrates an example of metadata out of the output data for settings. As illustrated in FIG. 4, the PDF file for settings preferably includes image data of a code symbol representing the identification information of the portable terminal 30, and metadata including the identification information of the portable terminal 30, information on terms of use, and setting information. An example of the code symbol is a two dimensional bar-code.

The image data of the code symbol can be displayed on the display unit 34 of the portable terminal 30. The image data of the code symbol can be read by the reading unit 25 of the image processing apparatus 20, whereby the identification information of the portable terminal 30 held by the user can be transmitted to the image processing apparatus 20.

It is also effective that when the PDF file for settings itself is transmitted to the portable terminal 30, the PDF file for settings may be analyzed by the portable terminal 30 to obtain the identification information.

The data in the PDF can include any large volume of information including the identification information, information on terms of use, and the setting information in the metadata illustrated with symbols A and B in FIG. 5. If the data is in the JPEG format, description in the data is limited to some extent. It is effective, therefore, that information on terms of use and the setting information in addition to the identification information are encoded into code symbols, with which necessary information is transmitted to the image processing apparatus 20.

Many applications relating to printing have a function to preview print results. Accordingly, the driverless printing application 33 may also include a function to display an image included in the PDF file for settings on a screen. Specifically, if the image of the code symbol is placed on the first page of the file, the image of the code symbol can be displayed on the screen at the beginning of preview, thereby suppressing the operation burden for displaying the image.

In the metadata illustrated in FIG. 5, in each position indicated with the symbols A and B, the identification information of the portable terminal 30 is exemplified by the MAC address "00:26:08:AA:AA:AA", the setting information is exemplified by the description of the color printing (Color), 2-up printing (2 in 1), and duplex printing (Duplex), and usage limitation information is exemplified by the description of the permission of printing up to 1,000 sheets (LimitPage=1000). The name and the ID of a user are described in the metadata as reference information.

With reference to FIG. 3 again, the communication unit 21 of the image processing apparatus 20 has a function to communicate with the driverless printing application 33 of the portable terminal 30. Like the communication unit 11 of the registration server 10, the communication unit 21 has a function, at least when communicating with the portable terminal 30, to obtains identification information that identifies the other party (the portable terminal 30) from the other party's device during the communication. In other words, the communication unit 21 also communicates with the other party using a communication protocol with which the identification information can be obtained.

The obtained identification information should be the same as the identification information obtained by the communication unit 11 of the registration server 10 and described in the output data for settings, e.g., the MAC address and the UUID.

An Internet printing protocol (IPP) is typically used by the driverless printing application for communication. If the IPP is used, the MAC address and the UUID of the other party can be obtained.

The communication unit 21 also has a function to communicate with the communication unit 11 of the registration server 10, in which any communication protocol may be used.

The determination unit 22 has a function to determine, when receiving the output data from the driverless printing application 33, whether the received output data is the output data for settings or other transmitted data presenting the content to be printed.

This determination is made, for example, depending on whether the received output data includes the identification information of the portable terminal 30 (and information on terms of use or the setting information as necessary), which should be included as long as the received output data is the output data for settings. The code symbol included in the output data is decoded, if required for the determination.

The determination can also be made depending on whether the received output data includes a predetermined identifier that presents it is an output data for settings. Examples of the identifiers are a specific text in the metadata or file, a pattern, an electronic watermark, or a specific symbol in the image data. The determination unit 22 has a function to determine, if it is determined that the received output data is the output data for settings, whether the source apparatus of the output data for settings is registered in the registration server 10, according to the output data for settings.

This determination is made by comparing the identification information of the portable terminal 30 obtained by the communication unit 21 during communication and the identification information of the portable terminal 30 described in the output data for settings. If these correspond with each other, the source apparatus of the output data for settings is registered in the registration server 10. In addition, the processing may be included in which it is confirmed that the output data for settings is not falsified or manipulated, using the format of the data, a check flag, or an electronic signature.

If the determination unit 22 determines that the source apparatus of the output data for settings is registered in the registration server 10, the determination unit 22 registers the received output data for settings together with the identification information of the source apparatus in the receiving and setting unit 23. This registration means that printing according to the received output data, ordered from the terminal with the identification information is permissible from now on. In other words, the image processing apparatus 20 is available for the terminal. This also means that the output data for settings corresponding to the source apparatus is referred to during the printing so that determination of availability of printing and print settings can be made. The registration to the receiving and setting unit 23 may be performed by extracting necessary information from the output data for settings instead of registering the output data for settings itself. In the registration, it does not matter who is the user of the portable terminal 30.

If the determination unit 22 determines that the received output data is the output data rather than the output data for settings, and the source apparatus of the output data has the identification information registered in the receiving and setting unit 23, the determination unit 22 registers the received output data as a standby print job in the output data management unit 24. The standby print job is registered associated with the identification information of the source apparatus.

The printing according to the registered output data is executed by a user of the portable terminal 30 operating the image processing apparatus 20. The user holds an image of a code symbol displayed on the display unit 34 of the portable terminal 30 according to the output data for settings over the reading unit 25 of the image processing apparatus 20. The image processing apparatus 20 then reads the image of the code symbol and decodes it. This enables the image processing apparatus 20 to recognize that the user in front of the image processing apparatus 20 is the user holding the portable terminal 30 with the identification information represented by the code symbol.

The reading unit 25 then reads the code symbol to obtain the identification information and passes it to the output data management unit 24.

The output data management unit 24 has the following function: when the output data management unit 24 receives the identification information from the reading unit 25, the output data management unit 24 displays a list of the standby output data registered associated with the identification information on the display device 207 illustrated in FIG. 1 to represent the list to the user; the output data management unit 24 receives the output data to be printed, selected out of the list by the user through the operating unit 205. The output data management unit 24 also has a function to make the output unit 27 execute the printing according to the selected output data, if the output data is selected and ordered for printing.

Upon the print execution, the output data management unit 24 refers to the receiving and setting unit 23 for the output data for settings registered associated with the identification information received from the reading unit 25. The output data management unit 24 thereby makes settings on a printing function according to the setting data included in the output data for settings, or determines permission of the ordered printing according to the information on terms of use. The output data management unit 24 passes the identification information received from the reading unit 25 to the payment information reference unit 26, and makes the payment information reference unit 26 query the registration information management unit 13 of the registration server 10 on the possibility of charging relating to the printing to be executed to the terminal with the identification information.

The output data management unit 24 then determines permission of the ordered printing according to the query result. Only if the output data management unit 2 determines that the print execution is permitted as a result of consideration of the above-described conditions, the output data management unit 24 enables the output unit 27 to execute the printing.

The user of the portable terminal 30 can thereby obtain a printout according to the output data the user ordered the image processing apparatus 20 for printing through the driverless printing application 33.

The following description is about operations to be performed by a user of the portable terminal 30 not registered in the registration server 10 to enable the image processing apparatus 20 execute printing.

Figure 6:
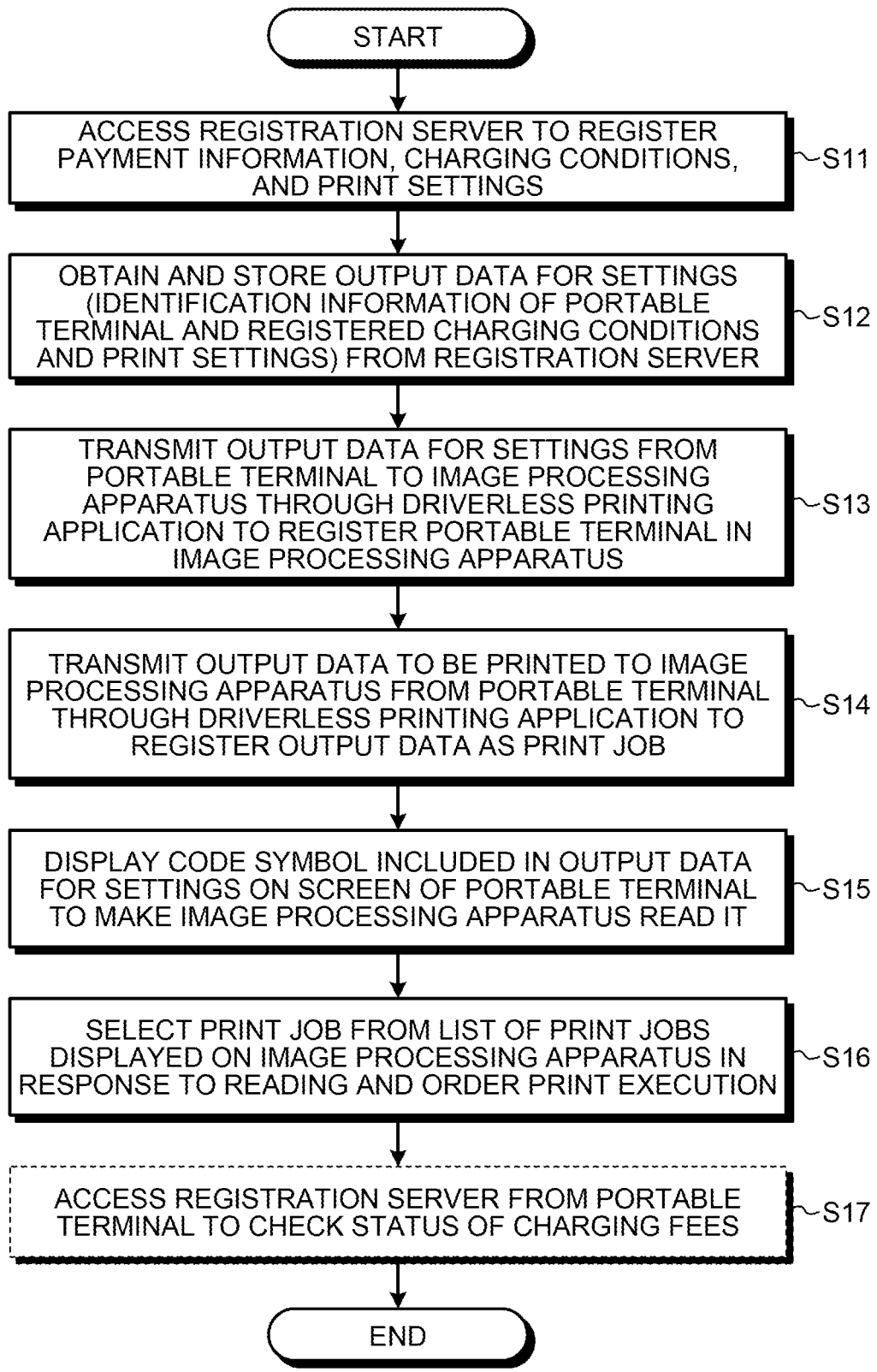
FIG. 6 is a flowchart illustrating operations to be performed by a user of the portable terminal not registered in the registration server to make the image processing apparatus execute printing.

FIG. 6 is a flowchart of the procedure of the operations.

The user of the portable terminal 30 accesses the registration server 10 by operating the portable terminal 30 to register the payment information, charging conditions, and print settings for the purpose of registering the portable terminal 30 in the registration server 10 (Step S11). This access can be achieved by inputting the uniform resource locator (URL) of the registration server 10 in a browser, or clicking the link transmitted by e-mail or found by searching. The identification information of the portable terminal 30 is obtained automatically by the registration server 10 during the access, which does not need to be input. This makes it difficult for the registration server 10 to receive registration with false identification information.

Once the registration of the portable terminal 30 in the registration server 10 is succeeded, the user can obtain the above-described output data for settings including the identification information of the portable terminal 30 from the registration server 10 and stores the output data for settings in an appropriate location (Step S12).

The user subsequently operates the portable terminal 30 to transmit the stored output data for settings to the image processing apparatus 20 through the driverless printing application 33, thereby registering the portable terminal 30 in the image processing apparatus 20 as a permitted apparatus for printing (Step S13). This transmission can be achieved by running the driverless printing application 33 and operating the application to order the image processing apparatus 20 to print the output data for settings.

The user then operates the portable terminal 30 to transmit the output data to be printed to the image processing apparatus 20 through the driverless printing application 33 so as to register the output data as a standby print job (Step S14).

The difference between the Steps S13 and S14 is only the data (file) to be transmitted. The operations up to this point may be performed at a place away from the image processing apparatus 20.

After that, the user moves to the vicinity of the image processing apparatus 20 while holding the portable terminal 30. The user operates the portable terminal 30 to display the image of the code symbol included in the output data for settings on the screen of the portable terminal 30, thereby making the reading unit 25 of the image processing apparatus 20 read the image of the code symbol (Step S15).

The image processing apparatus 20 displays a list of (the print jobs relating to) the standby output data transmitted from the portable terminal 30. The user can accordingly select the output data (the print job) to be printed and order print execution (Step S16).

The image processing apparatus 20 determines the possibility of printing according to the charge and terms of use in response to this order. If the image processing apparatus 20 determines the printing is possible, the image processing apparatus 20 executes the printing and outputs a printout. With the operations described above, the user of the portable terminal 30 can obtain a printout as a result of an intended output.

Printing may be charged sometimes. The print settings registered by the user at Step S11 are used as default settings, which may be changed before print execution.

When printing is charged by the image processing apparatus 20, the image processing apparatus 20 notifies the registration server 10 of that effect for registration of history of charging fees. It is recommended to enable the user to access the registration server 10 as necessary so as to check the status of charging fees to the portable terminal 30 (Step S17).

Figure 7:
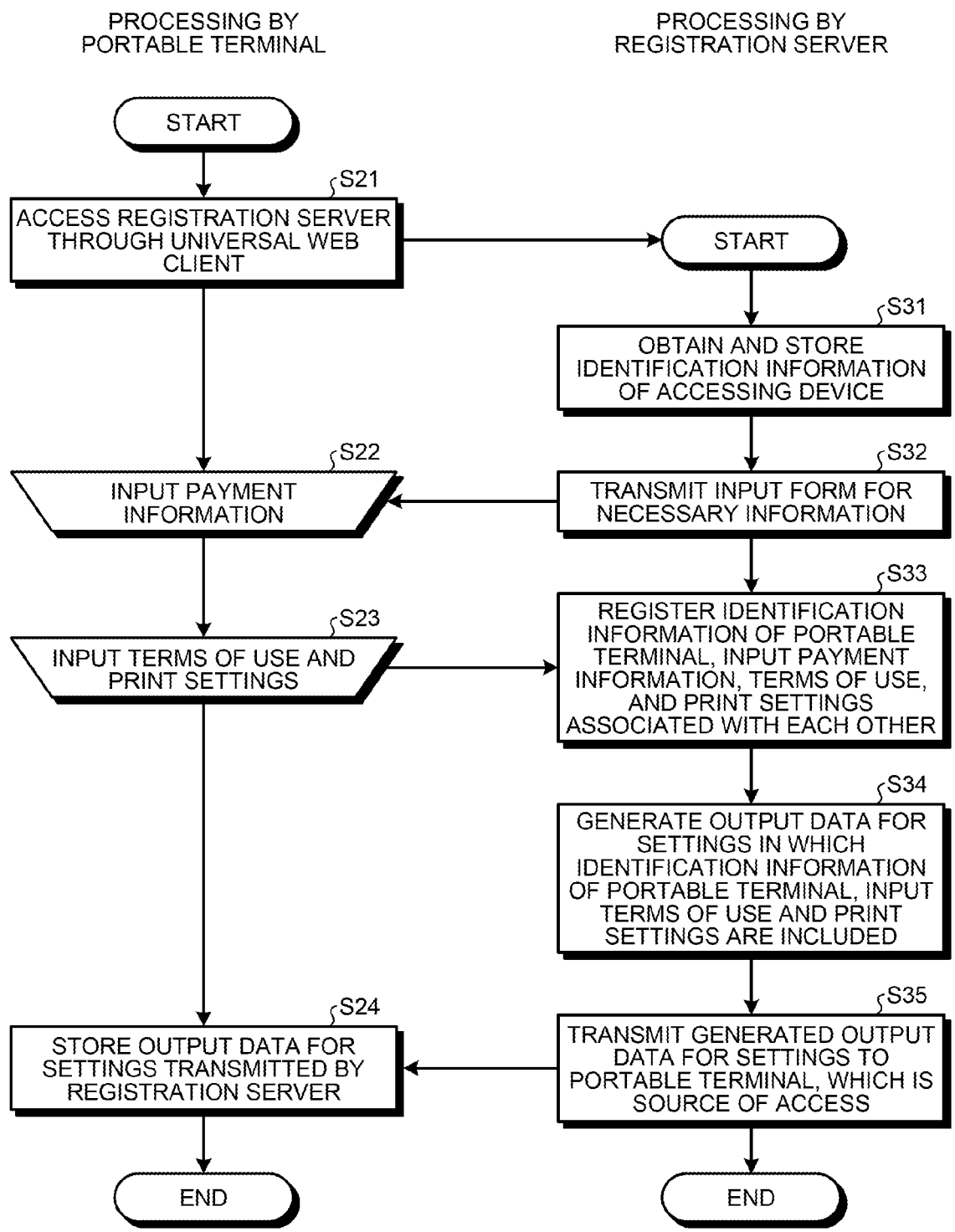
FIG. 7 is a flowchart of processing when a user registers the portable terminal in the registration server, which corresponds to Steps S11 and S12 illustrated in FIG. 6.

Described below is processing executed by the device and the like for achieving printing through the procedure illustrated in FIG. 6. Basically, the CPUs in the respective devices execute the following processing by executing necessary control programs. In the description below, for the purpose of simplification, the following processing is executed by the devices themselves. FIG. 7 illustrates processing when the portable terminal 30 is registered in the registration server 10, which corresponds to Steps S11 and S12 illustrated in FIG. 6.

In the processing illustrated in FIG. 7, the flowchart on the left represents the processing executed in the portable terminal 30, including user operations. The flowchart on the right includes the processing executed in the registration server 10. The arrows between the two flowcharts represent that the processing at the tip of the arrow is executed triggered by execution of the processing at the base of the arrow.

When a user orders the portable terminal 30 to access the registration reception screen of the registration server 10 by clicking, for example, the portable terminal 30 starts the processing of the flowchart illustrated on the left in FIG. 7. The portable terminal 30 firstly accesses the registration server 10 through the universal web client 31 (Step S21).

Accompanied with the access, the registration server 10 starts the processing of the flowchart illustrated on the right in FIG. 7 to obtain the identification information of the accessing device and stores the identification information therein (Step S31). The registration server 10 can obtain the identification information as described above, by simply being accessed from the portable terminal 30 through a typical communication protocol.

The registration server 10 then transmits an input form for necessary information to the portable terminal 30 (Step S32).

The portable terminal 30 displays the received form on the screen thereof and prompts the user to input the payment information, terms of use, and print settings (Step S22, Step S23). Once the user inputs the information above and orders the portable terminal 30 to transmit the information to the registration server 10, the portable terminal 30 transmits the information to the registration server 10.

The registration server 10 registers the identification information of the portable terminal 30 stored at Step S31, the payment information, terms of use, and print settings input in the form associated with each other (Step S33). Verification may be made in relation to the determination whether the registration is permissible. If the registration is performed, the output data for settings is generated in which the identification information of the portable terminal 30, the terms of use, and the print settings are included (Step S34). The registration server 10 then transmits the output data for settings to the portable terminal 30, which is the source of the access (Step S35). This is the end of the processing.

The portable terminal 30 on the other hand stores therein the output data for settings transmitted by the registration server 10 (Step S24), thereby also ending the processing.

The processing at Step S33 in the processing described above corresponds to the function of the identification information registration unit. The processing at step S35 corresponds to the function of the transmission unit.

Through the processing described above, the portable terminal 30 can be registered in the registration server 10. In the present embodiment, if the portable terminal 30 is registered in the registration server 10, the user of the portable terminal 30 is regarded as (if conditions such as charging fees are met) having an authority to enable the image processing apparatus 20 to execute printing. During the registration, it is preferred that verification be performed taking this assumption into account. An appropriate publicly known method may be employed for the verification.

Figure 8:
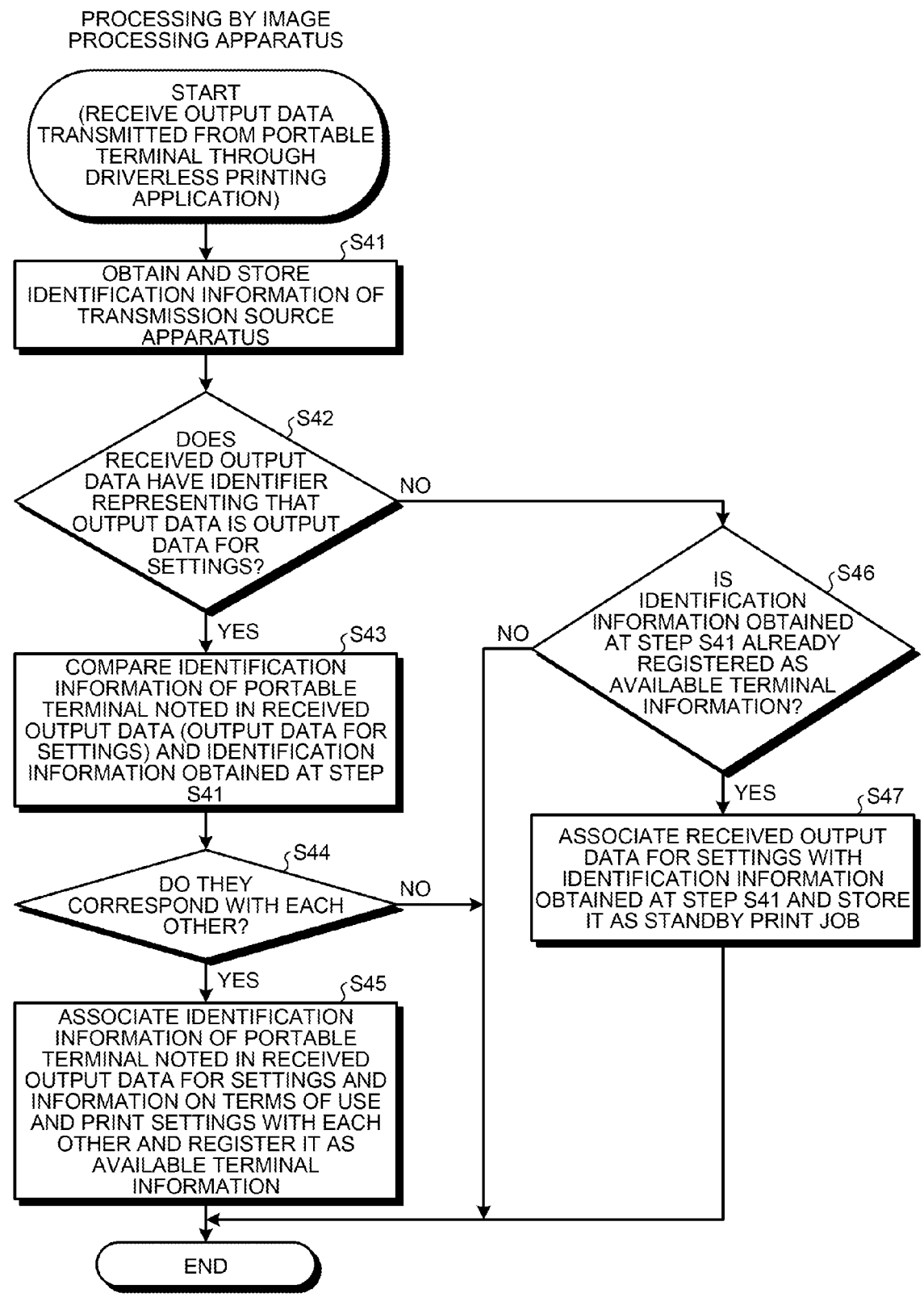
FIG. 8 is a flowchart of processing relating to registration of the portable terminal and a print job in the image processing apparatus, which corresponds to Steps S13 and S14 illustrated in FIG. 6.

FIG. 8 illustrates the processing relating to registration of the portable terminal 30 and print jobs in the image processing apparatus 20, which corresponds to Steps S13 and S14 illustrated in FIG. 6. The processing illustrated in FIG. 8 is executed by the image processing apparatus 20.

When the image processing apparatus 20 receives the output data transmitted from an external device such as the portable terminal 30 through the driverless printing application 33, the image processing apparatus 20 starts the processing of the flowchart illustrated in FIG. 8.

The image processing apparatus 20 firstly obtains the identification information of the source apparatus and stores it therein (Step S41). The image processing apparatus 20 can obtain the identification information as described above, by simply being accessed from the portable terminal 30 through the driverless printing application 33, which is commonly used.

The image processing apparatus 20 then determines whether the received output data has an identifier representing that the output data is the output data for settings (Step S42). If the answer to the determination is Yes, the processing proceeds to Step S43 and further to register the source apparatus according to the received output data (the output data for settings).

The image processing apparatus 20 subsequently compares the identification information of the portable terminal noted in the received output data (or presented with the code symbol, for example, included therein), and the identification information obtained at Step S41 (Step S43). This comparison is used for determination of whether the source apparatus of the data is registered in the registration server 10 according to the received output data (the output data for settings). If the information corresponds to each other as a result of the comparison, (Yes at Step S44), it is found that the source apparatus of the data is registered in the registration server 10.

Accordingly, the identification information of the portable terminal noted in the received output data and the information on terms of use and print settings noted likewise are associated with each other and registered as available terminal information (Step S45). This is the end of the processing.

The registration at Step S45 means that the identification information of the source apparatus of the output data is set so that a print request (output request) is received from the terminal with the identification information. That is to say, the terminal is registered as a terminal capable of using the image processing apparatus 20. During the registration, printing according to the received output data is not executed.

If the answer at Step S44 is No, it cannot be confirmed that the source apparatus of the output data is registered in the registration server 10, thus the processing ends without registering available terminal information.

If the answer at Step S42 is No, the processing proceeds to Step S46 and further to register the print job according to the received output data.

The image processing apparatus 20 subsequently determines whether the identification information obtained at Step S41 is already registered as available terminal information (Step S46). If the answer here is Yes, it is found that the received output data this time is transmitted from an eligible (appropriate) device, which is permitted to transmit a print request. Accordingly, the received output data is associated with the identification information obtained at Step S41 and stored as a standby print job (Step S47). This is the end of the processing.

In the processing described above, the processing at Steps S43 and S44 corresponds to the function of a determination unit; the processing at Step S45 corresponds to the function of an available terminal registration unit; and the processing at Steps S46 and S47 corresponds to the function of an output control unit.

Through the processing described above, the portable terminal 30 registered in the registration server 10 can be selectively registered in the image processing apparatus 20. Additionally, the output data transmitted by the portable terminal 30 already registered in the image processing apparatus 20 can be stored as a standby print job.

Figure 9:
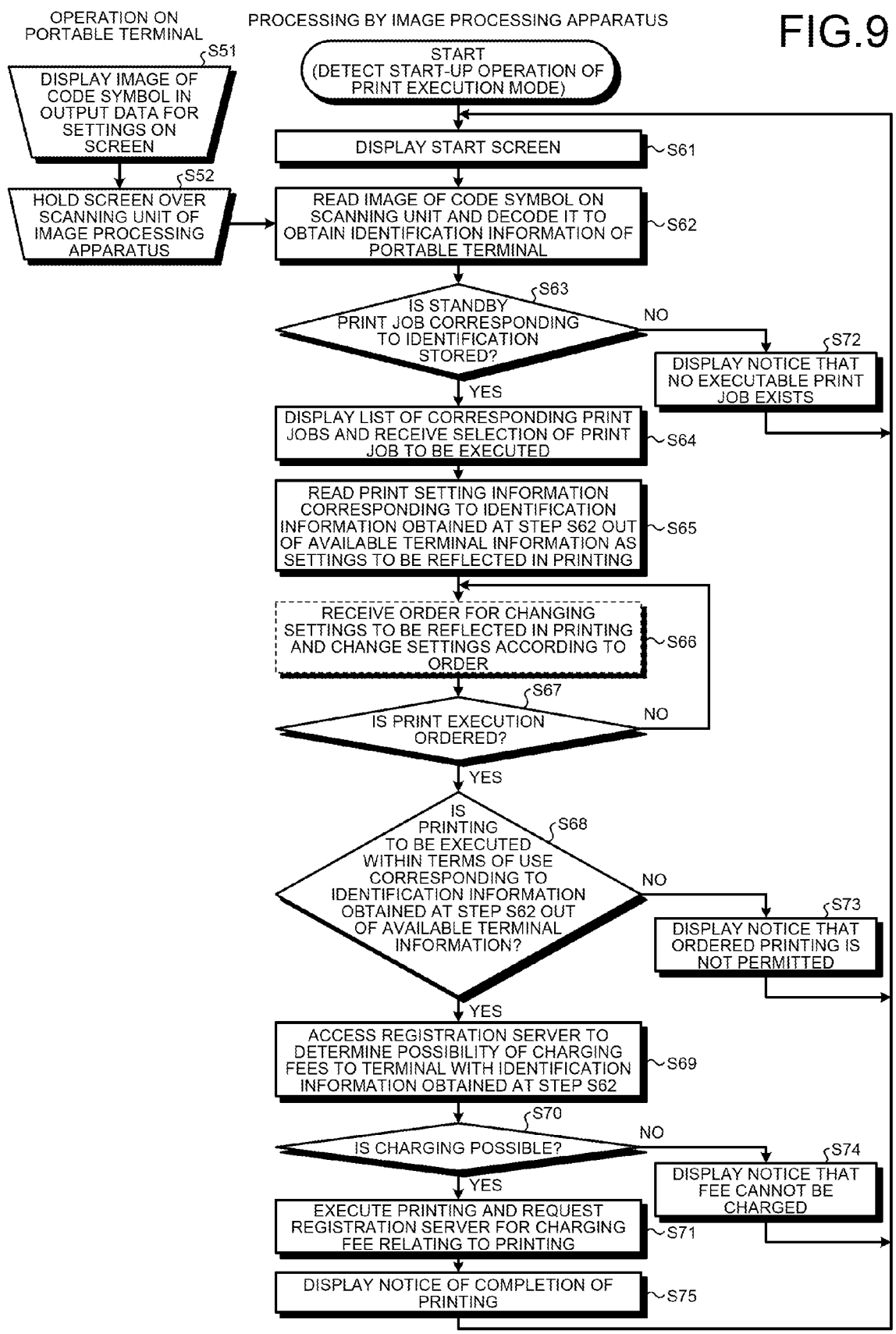
FIG. 9 is a flowchart of processing relating to execution of the print job, which corresponds to Steps S15 and S16 illustrated in FIG. 6.

FIG. 9 illustrates processing relating to execution of a print job, which corresponds to Steps S15 and S16 illustrated in FIG. 6. The processing illustrated in FIG. 9 is also executed by the image processing apparatus 20.

When the image processing apparatus 20 detects in the operating unit 205 the start-up operation of print execution mode in which the print job is executed, the image processing apparatus 20 starts the processing of the flowchart illustrated in FIG. 9.

In this processing the image processing apparatus 20 firstly displays a predetermined start screen on the display device 207 (Step S61). In this state, when the user operates the portable terminal 30 so that the image of the code symbol in the output data for settings is displayed on the screen of the portable terminal 30 (Step S51) and holds the image of the code symbol in the output data for settings on the screen over the scanning unit 206 of the image processing apparatus 20 (Step S52), the scanning unit 206 reads the image of the code symbol and decodes it to obtain the identification information of the portable terminal 30 (Step S62).

The image processing apparatus 20 then determines whether the standby print job corresponding to the identification information obtained at Step S62 is stored (Step S63). If the print job is stored, the image processing apparatus 20 displays a list of the print jobs on the display device 207 and receives the print job selected to be executed (Step S64).

Once any one of the print jobs is selected, the image processing apparatus 20 reads the setting information corresponding to the identification information obtained at Step S62 out of the available terminal information registered at Step S45 illustrated in FIG. 8 as the settings to be reflected in the printing (Step S65). The image processing apparatus 20 then receives an order of changing settings to be reflected in the printing as necessary. Subsequently, the image processing apparatus 20 changes the settings according to the order (Step S66). If a print execution is ordered (Yes at Step S67), the processing proceeds to Step S68 and further to execute the printing relating to the selected print job according to the settings at that time.

The image processing apparatus 20 then determines whether the printing to be executed is within the terms of use corresponding to the identification information obtained at Step S62 out of the available terminal information (Step S68). For example, the image processing apparatus 20 determines whether the number of printed sheets exceeds the limitation or whether prohibited settings are made.

If the image processing apparatus 20 determines that the printing to be executed is within the terms of use at Step S68, the image processing apparatus 20 then accesses the registration server 10 to determine the possibility of charging fees to the terminal with the identification information obtained at Step S62 (Step S69). Specifically, the image processing apparatus 20 queries the registration server 10 whether the fee of the printing to be executed can be charged through the remaining amount in the prepaid system or a credit card transaction, for example.

As a result, if the fee of the printing to be executed can be charged (Yes at Step S70), the image processing apparatus 20 executes the printing according to the settings made at Steps S65 and S66 and charges the registration server 10 for a fee relating to the printing (Step S71). After that, the image processing apparatus 20 displays a notice of completion of the printing on the display device 207 (Step S75). The processing returns to Step S61.

If the answer is No at Step S70, the image processing apparatus 20 does not execute the printing, displays a notice that the fee of the printing to be executed cannot be charged on the display device 207 (Step S74), and returns the processing to Step S61.

If the answer is No at Step S68, the image processing apparatus 20 does not execute the printing, displays a notice that the ordered printing is not permitted on the display device 207 (Step S73), and returns the processing to Step S61.

If the answer is No at Step S63, the image processing apparatus 20 displays a notice that no executable print job exists on the display device 207 (Step S72), and returns the processing to Step S61.

If the processing to shift the image processing apparatus 20 to another mode is detected during the processing illustrated in FIG. 9, the processing ends due to this interruption.

In the processing described above, the processing at Steps S68 to S70 corresponds to the function of the output control unit; the processing at Step S71 corresponds to the output unit.

Through the processing described above, the printing according to the output data transmitted to the image processing apparatus 20 by the portable terminal 30 already registered in the image processing apparatus 20 can be executed.

According to the output system of the embodiment described above, when the registration server 10 receives a registration request from the portable terminal 30, the registration server 10 provides the output data for settings representing the identification information obtained from the portable terminal 30 during the communication with the portable terminal 30. When the image processing apparatus 20 receives the output data for settings from the portable terminal 30 and the identification information represented by the output data for settings corresponds with the identification information obtained from the portable terminal 30 during the communication with the portable terminal 30, the image processing apparatus 20 makes settings so as to receive an output request from the terminal with the identification information.

With the structure described above, the user of the portable terminal 30 can enable the image processing apparatus 20 to recognize that the portable terminal 30 is registered in the registration server 10, without directly operating the image processing apparatus 20 to input information therein, so that the image processing apparatus 20 becomes available. Accordingly, the user's operation burden for the registration can be reduced. It is not essential that the image processing apparatus 20 and the registration server 10 can communicative with each other.

According to the output system of the embodiment, the MAC address or the UUID is used for the identification information of the portable terminal 30 so that the registration server 10 and the image processing apparatus 20 can obtain the information during the communication with the portable terminal 30. The identification information can be therefore obtained by the registration server 10 and the image processing apparatus 20 without installing a specific driver for the registration server 10 or the image processing apparatus 20 on the portable terminal 30.

In the embodiment, the output data for settings is provided in the same format as the output data transmitted by the portable terminal 30 to the image processing apparatus 20 for ordering an output for printing or the like, whereby the output data can be transmitted through the same application used for ordering an output. Such an application program obviously includes a driverless printing application program. The user therefore can register the portable terminal 30 in the image processing apparatus 20, with a driverless system, without installing a specific driver for the registration server 10 or the image processing apparatus 20 on the portable terminal 30. That is to say, the user can enable the image processing apparatus 20 to confirm the authorization of the user by itself.

This is labor saving for the user who wants to use the image processing apparatus 20 to install the driver. From the viewpoint of a vendor of the image processing apparatus 20, the cost required to develop and distribute the specific driver can be eliminated.

Furthermore, when the registration server 10 creates the output data for settings, if an identifier is added to the output data for settings to be distinguished from the output data other than the output data for settings, the image processing apparatus 20 that received data in the format of the output data can readily determine whether the received data is the output data for settings.

Furthermore, the payment information is also registered in the registration server 10, associated with the registered identification information of the portable terminal 30 so that the image processing apparatus 20 can query the registration server 10 on the possibility of charging by using the identification information of the device that has transmitted the output data as a key. As a result, the image processing apparatus 20 can access the registration server 10 for the payment information relating to the user who has requested the printing by using the identification information of the portable terminal 30 as a key. This eliminates the need for the user to input information such as a code for charging to the image processing apparatus 20 for checking the possibility of the charging. The user's operation burden can also be reduced accordingly.

The output data for settings may include information on terms of use or setting information as well as the identification information of the portable terminal 30. Additionally, when the output data for settings is transmitted to the image processing apparatus 20, the information on terms of use or the setting information may be registered in the image processing apparatus 20, associated with the identification information of the portable terminal 30, to be referred to during print execution. This facilitates limitation of use of the image processing apparatus 20 or the print settings intended by the user, made for respective portable terminals 30.

In the embodiment, the image processing apparatus 20 also includes the image reading unit. When the image reading unit reads a code image representing the identification information of the portable terminal 30 that is the transmission source of the output data, the image processing apparatus 20 executes printing relating to the output data. This prevents a printout relating to the output data from being taken away by other persons, thereby surely providing the printout to the user of the portable terminal 30. In this case, if the image of the code symbol is placed on the first page of the file of the output data for settings, the image of the code symbol can be readily displayed on the portable terminal 30 through a function to preview a driverless printing application, without a specific application. Therefore, a specific driver for the image processing apparatus 20 is not required, even in the case for obtaining an anti-take away effect.

Second Embodiment

The second embodiment will now be described. Before detailed description, the outline of the second embodiment is provided. The second embodiment differs from the above-described first embodiment in that the output data for settings includes the payment information and an e-mail address of the portable terminal in addition to the identification information of the portable terminal, the information on terms of use and the information on print settings described above. With this structure, in the second embodiment, when the print job received from the portable terminal does not meet the charging conditions or the terms of use, the image processing apparatus can notify the user of the portable terminal of that effect.

If a print job from the portable terminal does not meet charging conditions, for example, the image processing apparatus transmits hypertext data inquiring whether the user will add the credit along with a notice of shortage of the credit (fee) to the e-mail address of the portable terminal via e-mail. If the user selects addition of the credit, the user accesses the registration server using an http, for example. The accessed registration server controls an input form screen for the payment information to be displayed on a browser on the portable terminal, thereby enabling the user to input additional credit as necessary. The registration server then changes the payment information according to the user input and transmits the output data for settings including the changed payment information to the portable terminal. After that, the portable terminal transmits the changed output data for settings to the image processing apparatus again.

Alternatively, if a print job from the portable terminal does not meet the terms of use, for example, the image processing apparatus transmits hypertext data inquiring whether the user will reset the print settings to the e-mail address of the portable terminal via e-mail. If the user selects to reset the print settings, the user accesses the image processing apparatus using an http, for example. The accessed image processing apparatus performs control so that a list of the print jobs transmitted from the portable terminal or a screen for print settings is displayed on a browser on the portable terminal. According to the input by the user, a print job in the list may be deleted and the information on the print settings may be changed.

In the second embodiment, furthermore, the image processing apparatus has a function of determining whether the output of the standby print job is forgotten. If the image processing apparatus determines that the print job is forgotten, the image processing apparatus deletes the print job or transmits a notice that the output of the standby print job is forgotten to the e-mail address of the portable terminal, which is the transmission source of the print job.

The second embodiment will now be described in detail. Explanations on common aspects to the first embodiment described above are omitted as appropriate.

Figure 10:
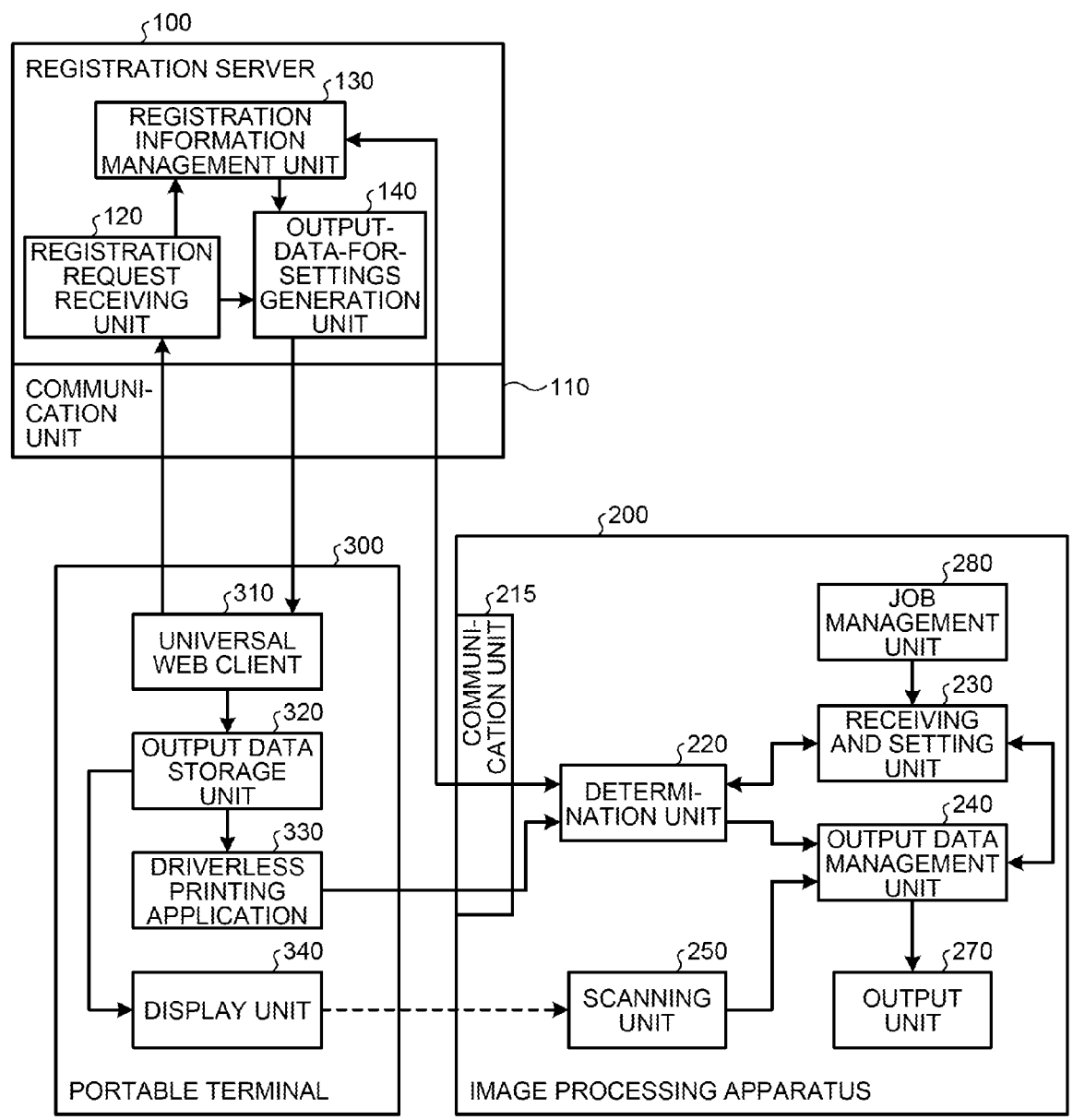
FIG. 10 is a diagram illustrating an example of the function structure of a registration server, an image processing apparatus, and a portable terminal according to a second embodiment of the present invention.

FIG. 10 is an exemplary diagram illustrating the function structure of a registration server 100, an image processing apparatus 200, and a portable terminal 300 according to the second embodiment of the present invention.

The functions of the registration server 100 will now be described, focusing on the differences from the first embodiment. A registration request receiving unit 120 has a function to receive an input of the e-mail address assigned to the portable terminal 300 in addition to the input exemplified in the first embodiment. A registration information management unit 130 stores the identification information (MAC address), the payment information, information on terms of use, information on print settings, and the e-mail address of the portable terminal 300 associated with each other, according to the information provided by the registration request receiving unit 120. In the descriptions below, the information in which the identification information, the payment information, information on terms of use, information on print settings, and the e-mail address may be referred to as registration information.

When the portable terminal 300 is registered in the registration server 100, the output-data-for-settings generation unit 140 generates output data for settings as the data representing the registration. This generated output data for settings includes the identification information, the payment information, information on terms of use, information on print settings, and the e-mail address of the portable terminal 300, which are provided from the registration request receiving unit 120 and associated with each other (registration information). The output-data-for-settings generation unit 140 transmits the generated output data for settings to the portable terminal 300 that has requested the registration. The output data for settings includes the payment information and the e-mail address of the portable terminal 300, which is different from the first embodiment.

The functions of the image processing apparatus 200 will now be described, focusing on the difference from the first embodiment. The image processing apparatus 200 has a job management unit 280 instead of the payment information reference unit 26. The function of the job management unit 280 will be described later in detail. When the image processing apparatus 200 communicates with the portable terminal 300, a communication unit 215 has a function to obtain a MAC address and an IP address from the portable terminal 300, which is the other party of the communication during the communication. The MAC address is the identification information specific to the portable terminal 300. The IP address is used for identifying the portable terminal 300 on the network.

When the image processing apparatus 200 receives the output data from the driverless printing application 330, a determination unit 220 determines whether the received output data is the output data for settings or other data transmitted as a print job that requests printing. Such a print job includes the data representing the content to be printed and information representing the details of the print settings (e.g., information specifying color printing or monochrome printing), for example.

If the determination unit 220 determines that the received output data from the portable terminal 300 is the output data for settings and the portable terminal 300 is registered in the registration server 100, the determination unit 220 registers the received output data for settings along with the identification information of the portable terminal 300 (MAC address) in the receiving and setting unit 230. A pair of the output data for settings and the identification information may be referred to as available terminal information.

If the determination unit 220 determines that the received output data from the portable terminal 300 is a print job and the portable terminal 300, which is the transmission source of the print job, has the identification information already registered in the receiving and setting unit 230, the determination unit 220 associates the received print job with the MAC address and the IP address of the portable terminal 300, and registers the print job as a standby print job in the output data management unit 240. The determination unit 220 also refers to the payment information or information on terms of use included in the output data for settings of the portable terminal 300, which is the transmission source of the received print job (the output data for settings registered in the receiving and setting unit 230), and determines whether the received print job meets terms of use or the charging conditions.

If the determination unit 220 determines that the received print job does not meet the terms of use or the charging conditions, the determination unit 220 transmits a notice that the print job does not satisfy the condition (the terms of use or the charging conditions) along with hypertext data inquiring whether the user will add the credit, reset the information on the print setting, or delete the print job, to the e-mail address included in the output data for settings of the portable terminal 300, which is the transmission source of the print job, via e-mail through the communication unit 215.

When the user of the portable terminal 300, to which the above-described hypertext data is transmitted, selects "Add charging" on a browser on the portable terminal 300 through a URL link, the portable terminal 300 accesses the registration server 100 using an http, for example. The accessed registration server 100 controls an input form screen for the payment information to be displayed on a browser on the portable terminal 300, thereby enabling the user to input additional credit as necessary. The registration server 100 then changes the payment information according to the user input and transmits the output data for settings including the changed payment information to the portable terminal 300. The portable terminal 300 transmits the changed output data for settings to the image processing apparatus 200. In the image processing apparatus 200 as well, therefore, the output data for settings of the portable terminal 300 already registered in the receiving and setting unit 230 is updated with the changed output data for settings.

When the user of the portable terminal 300, to which the above-described hypertext data is transmitted, selects "Reset information on print settings" on the browser on the portable terminal 300 through a URL link, the portable terminal 300 accesses the image processing apparatus 200 using an http, for example. The accessed determination unit 220 determines whether the MAC address of the accessing portable terminal 300 is already registered as available terminal information in the receiving and setting unit 230. If the accessed determination unit 220 determines that the MAC address of the portable terminal 300 is already registered, the determination unit 220 performs control so that a list of the print jobs transmitted from the portable terminal 300 or a screen for print settings is displayed on a browser on the portable terminal 300. This enables the user to input information on the print settings or input an order for deleting the print job. The determination unit 220 then changes the information on print settings or deletes the print job according to the user input and transmits the information representing the changed content to the portable terminal 300.

The function of the job management unit 280 will now be described. The job management unit 280 determines whether the output of the standby print job is forgotten. If the job management unit 280 determines that the output of the print job is forgotten, the job management unit 280 deletes the print job or transmits a notice that the output of the standby print job is forgotten to the e-mail address included in the output data for settings of the portable terminal 300, which is the transmission source of the print job. More specifically, when there is no an internet control message protocol (ICMP) reply from an IP address associated with the standby print job or the MAC address of the device with an ICMP reply differs from the MAC address corresponding to the standby print job, the job management unit 280 determines that the user has forgotten the output of the print job. The job management unit 280 then deletes the print job or transmits a notice that the output of the print job is forgotten to the e-mail address of the portable terminal 300, which can be identified by the MAC address corresponding to the print job via e-mail.

In the embodiment, as described above, the output data for settings includes the payment information. During print execution, accordingly, if the output data management unit 240 refers to the output data for settings associated with the identification information that has been read by the reading unit 250 and registered in the receiving and setting unit 230, the output data management unit 240 can determine the possibility of charging relating to the printing to be executed. This eliminates the function of the payment information reference unit 26 described in the first embodiment, thereby eliminating the necessity of the query to the registration server 100 on the possibility of charging relating to the printing to be executed.

Figure 11:
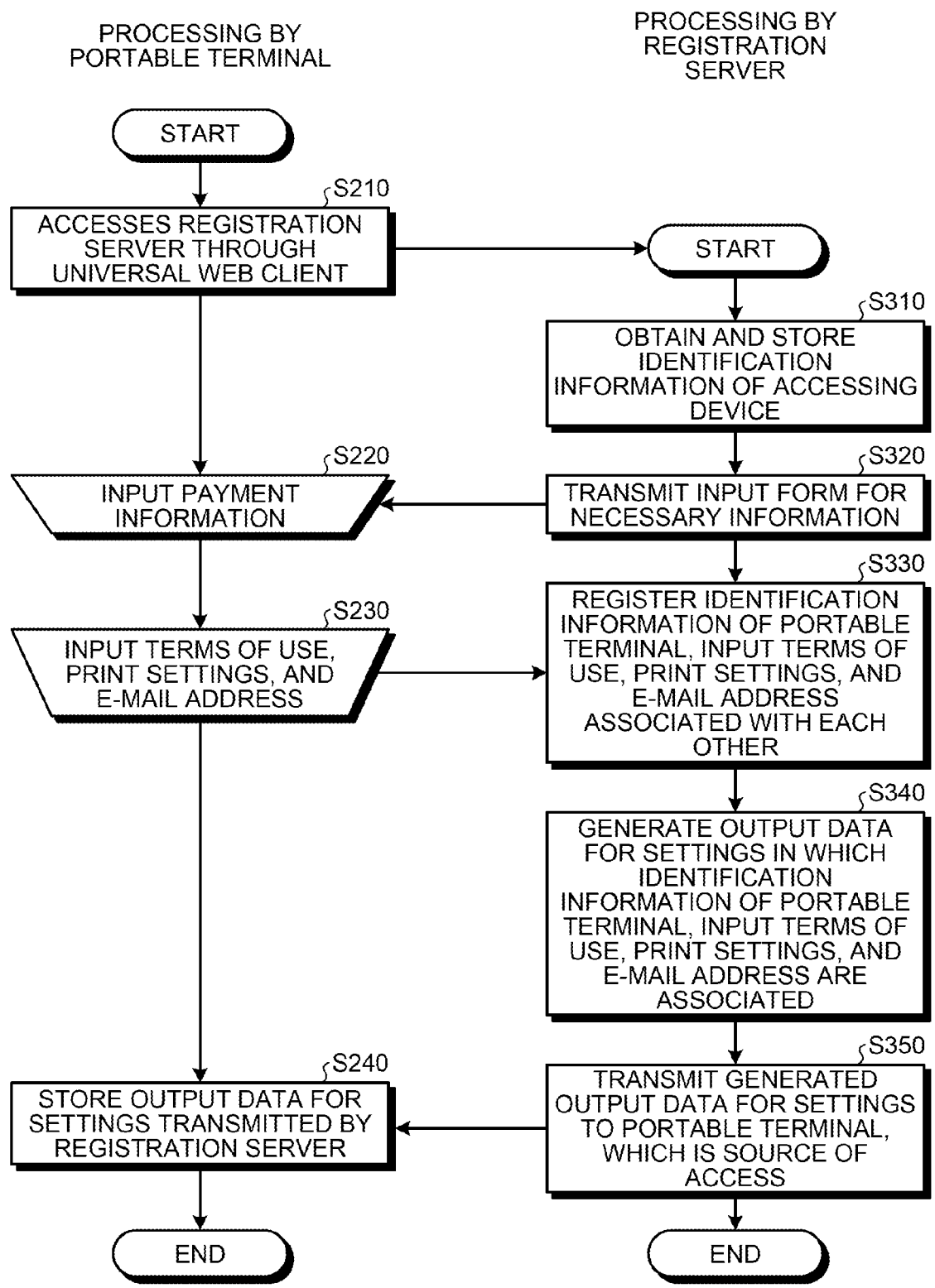
FIG. 11 is a flowchart of an example of processing when the portable terminal is registered in the registration server according to the second embodiment.

FIG. 11 is a flowchart of an example of processing when the portable terminal 300 is registered in the registration server 100. The flowchart illustrated on the left in FIG. 11 represents the processing performed by the portable terminal 300, including operations by a user. The flowchart illustrated on the right in FIG. 11 represents the processing performed by the registration server 100. The arrows between the two flowcharts represent that the processing at the tip of the arrow is executed triggered by execution of the processing at the base of the arrow.

The processing illustrated in FIG. 11, at Steps S210, S310, and S320 is the same as the processing at Steps S21, S31, and S32 illustrated in FIG. 7, thus detailed explanation thereof is omitted.

At Steps S220 and S230, the portable terminal 300 displays the received form from the registration server 100 on the screen thereof and prompts the user to input the payment information, terms of use, and print settings, and the e-mail address. Once the user inputs the information above and orders the portable terminal 300 to transmit the information to the registration server 100, the portable terminal 300 transmits the information to the registration server 100.

The registration server 100 registers the identification information of the portable terminal 300 (MAC address) stored at Step S310, the payment information, information on terms of use, information on print settings, and the e-mail address that have been input in the form, associated with each other (Step S330). Verification may be made at this point on the determination whether the registration is permissible. For the registration, output data for settings is generated in which the identification information of the portable terminal 300, the payment information, information on terms of use, information on print settings, and the e-mail address are associated with each other (Step S340). The registration server 100 then transmits the output data for settings to the portable terminal 300, which is an access source (Step S350), and ends the processing. The portable terminal 300 stores the output data for settings transmitted from the registration server 100 (Step S240), and ends the processing.

Figure 12:
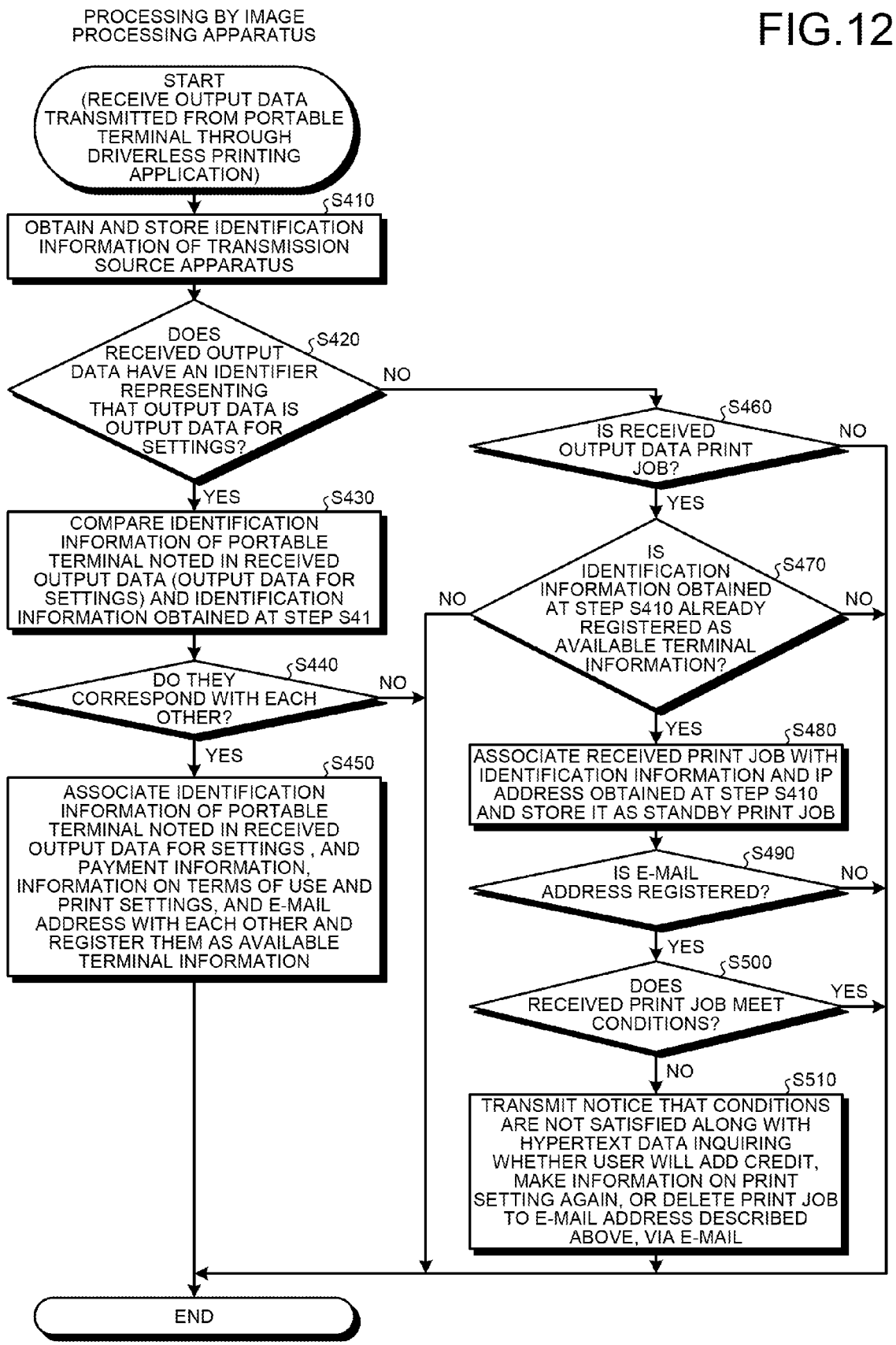
FIG. 12 is a flowchart of an example of processing relating to registration of the portable terminal and a print job in the image processing apparatus according to the second embodiment.

FIG. 12 is a flowchart of an example of processing relating to registration of the portable terminal 300 and a print job in the image processing apparatus 200. The processing illustrated in FIG. 8 is executed by the image processing apparatus 20.

In the processing illustrated in FIG. 12, the processing at Steps S410 to S440 are the same at Steps S41 to S44 illustrated in FIG. 8, thus detailed explanation of the processing is omitted. In this example, at Step S410, the communication unit 215 obtains the identification information and the IP address of the portable terminal, which is the transmission source of the output data. At Step S440, when the identification information (MAC address) included in the received output data for settings corresponds with the identification information obtained at Step S410 (Yes at Step S440), the determination unit 220 associates the identification information included in the received output data for settings with the payment information, information on terms of use, information on print settings, and the e-mail address also included in the output data for settings, registers the identification information as available terminal information (S450), and ends the processing.

If the answer is No at Step S420, the determination unit 220 determines whether the received output data is the print job (Step S460). If the determination unit 220 determines that the received output data is not the print job (No at Step S460), the determination unit 220 ends the processing. If the determination unit 220 determines that the received output data is the print job (Yes at Step S460), the determination unit 220 determines whether the identification information obtained at Step S410 is already registered as available terminal information (Step S470). If the determination unit 220 determines that the identification information obtained at Step S410 is already registered as available terminal information (Yes at Step S470), the determination unit 220 associates the received print job with the identification information and the IP address obtained at Step S410 and stores the print job as the standby print job (S480). If the determination unit 220 determines that the identification information obtained at Step S410 is not yet registered as available terminal information (No at Step S470), the processing ends.

After the above-described Step S480, the determination unit 220 determines whether an e-mail address is registered in the available terminal information including the identification information obtained at Step S410 (Step S490). If the determination unit 220 determines that an e-mail address is not registered (No at Step S490), the processing ends. If the determination unit 220 determines that an e-mail address is registered (Yes at Step S490), the determination unit 220 determines whether the received print job meets the conditions (e.g., the charging conditions or the terms of use), with reference to the available terminal information including the identification information obtained at Step S410 (Step S500). If the determination unit 220 determines that the received print job meets the conditions (Yes at Step S500), the processing ends. If the determination unit 220 determines that the received print job does not meet the conditions (No at Step S500), the determination unit 220 transmits a notice that the print job does not satisfy the conditions (the terms of use or the charging conditions) along with hypertext data inquiring whether the user will add the credit, reset the information on the print setting, or delete the print job, to the e-mail address described above, via e-mail through the communication unit 215 (Step S510).

Figure 13:
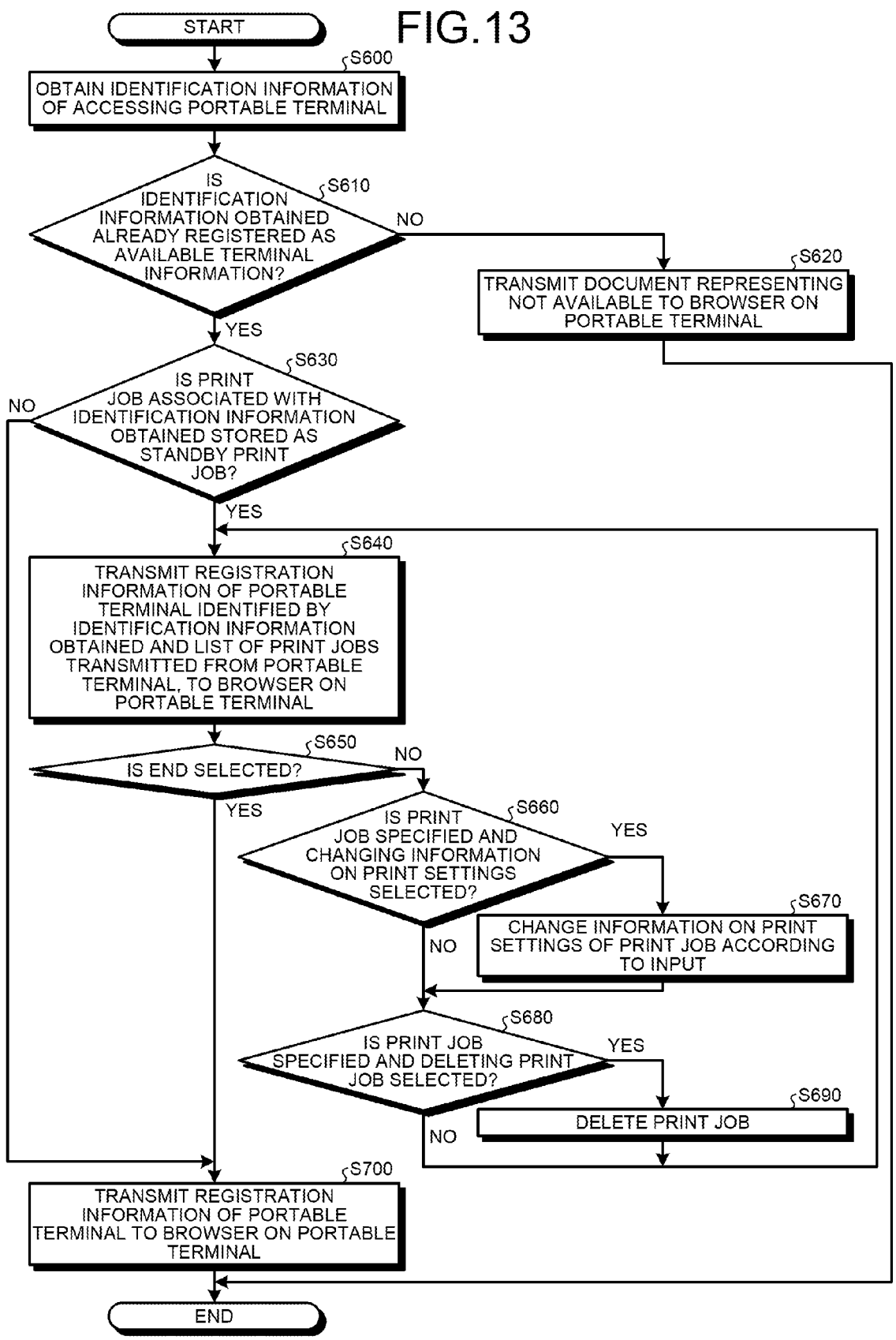
FIG. 13 is a flowchart of an example of operations of the image processing apparatus when a user of the portable terminal who receives hypertext data from the image processing apparatus selects "Reset information on print settings" on a browser on the portable terminal according to the second embodiment.

When the user of the portable terminal 300, who has received the above-described hypertext data, selects "Reset information on print settings" on the browser on the portable terminal 300 through a URL link, the portable terminal 300 accesses the image processing apparatus 200 using an http, for example. FIG. 13 is a flowchart of an example of operations of the image processing apparatus in this case. As illustrated in FIG. 13, the communication unit 215 firstly obtains the identification information of the portable terminal that has accessed the web (Step S600). The determination unit 220 then determines whether the identification information obtained at Step S600 is already registered as available terminal information (Step S610). If the determination unit 220 determines that the identification information obtained at Step S600 is not yet registered as available terminal information (No at Step S610), the determination unit 220 transmits a document representing that the image processing apparatus 200 is not available to the browser on the accessing portable terminal, through the communication unit 215 (Step S620), and the processing ends.

If the determination unit 220 determines that the identification information obtained at Step S600 is already registered as available terminal information (Yes at Step S610), the determination unit 220 determines whether the print job associated with the identification information obtained at S600 is stored as a standby print job (Step S630). If the determination unit 220 determines that the print job associated with the identification information obtained at Step S600 is not yet stored as a standby print job (No at Step S630), the processing proceeds to Step S700 described later. If the determination unit 220 determines that the print job associated with the identification information obtained at Step S600 is stored as a standby print job (Yes at Step S630), the determination unit 220 transmits the registration information of the portable terminal identified by the identification information obtained at Step S600 and a list of the print jobs transmitted from the portable terminal, to a browser on the portable terminal (Step S640). It is preferred that certain marking information be added to the information presenting the list of print jobs, so that the user can identify the print jobs that are not available. On the portable terminal, which is the destination of the information, the registration information of the portable terminal and the list of the print jobs transmitted from the portable terminal are displayed. The user can therefore input a change to the information on the print settings or delete (cancel) a print job while watching the display screen on the portable terminal.

After Step S640, the determination unit 220 determines whether an input for selecting the end is received from the user of the portable terminal (Step S650). If the determination unit 220 determines that the input for selecting the end is received (Yes at Step S650), the processing proceeds to Step S700 described later. If the determination unit 220 determines that the input for selecting the end is not received (No at Step S650), the determination unit 220 determines whether any print job specified and an input for changing the information on print settings is selected (Step S660). If the determination unit 220 determines that any print job is specified and an input for changing the information on print settings is selected (Yes at Step S660), the determination unit 220 changes the information on print settings according to the input by the user (Step S670). This updates the registration information of the portable terminal held by the image processing apparatus 200 from time to time.

If the answer is No at Step S660, the determination unit 220 determines whether any print job is specified and an input for deleting the print job is received (Step S680). If the determination unit 220 determines that any print job is specified and an input for deleting the print job is received (Yes at Step S680), the determination unit 220 deletes the print job selected to be deleted from the output data management unit 240 (Step S690). The processing at and after Step S640 is performed again. If the answer is No at Step S680, the processing at and after Step S640 is performed again as well.

At Step S630 described above, if the determination unit 220 determines that the print job associated with the identification information obtained at S600 is not stored as a standby print job (No at Step S630), alternatively, at Step S650 described above, if the determination unit 220 determines that the input for selecting the end is received (Yes at Step S650), the processing proceeds to Step S700. At Step S700, the determination unit 220 transmits through the communication unit 215 at least the registration information of the portable terminal that has accessed a browser on the portable terminal. The determination unit 220 may transmit the information representing a list of the print jobs transmitted from the portable terminal (certain marking information may be added), for example, to the accessing portable terminal.

FIG. 14 is a flowchart of an example of processing performed by the job management unit 280. The job management unit 280 executes the processing illustrated in FIG. 14 at a predetermined period. Below is the detailed description of the processing illustrated in FIG. 14. The job management unit 280 extracts an IP address associated with a standby print job held by the output data management unit 240 and transmits an internet control message protocol (ICMP) packet to the extracted IP address (Step S800). More specifically, the job management unit 280 executes ping, which is a network diagnostic program for a network using an ICMP protocol, thereby performing control to transmit the ICMP protocol to the extracted IP address.

The job management unit 280 then determines whether there is a reply to the ping (Step S810). If the job management unit 280 determines that there is no reply the ping (No at Step S810), the processing proceeds to Step S860 described later. If the job management unit 280 determines that there is a reply to the ping (Yes at Step S810), the job management unit 280 determines whether the identification information (MAC address) of the device replying to the ping corresponds with the identification information associated with the print job along with the IP address extracted at Step S800 in the output data management unit 240 (Step S820). If the answer is No at Step S820, the processing proceeds to Step S860 described later.

If the job management unit 280 determines that the identification information (MAC address) of the device replying to the ping corresponds with the identification information associated with the print job along with the IP address extracted at Step S800 (Yes at Step S820), the job management unit 280 transmits the ICMP packet into a local segment through broadcast transfer (Step S830). The job management unit 280 subsequently determines whether the identification information of any device that has replied to the ICMP packet transmitted through broadcast transfer corresponds with the identification information associated with the print job along with the IP address extracted at Step S800 in the output data management unit 240 (Step S840). If the answer is No at Step S840, the processing proceeds to Step S860 described later.

If the job management unit 280 determines that the identification information of any device that has replied to the ICMP packet transmitted through the broadcast transfer corresponds with the identification information associated with the print job along with the IP address extracted at Step S800 in the output data management unit 240 (Yes at Step S840), the job management unit 280 updates the IP address extracted at Step S800 with the IP address of the device that has replied to the ICMP packet transmitted through the broadcast transfer (Step S850), and ends the processing.

If the answer is No at Step S840, the processing proceeds to Step S860. At Step S860, the job management unit 280 identifies the available terminal information including the identification information associated with the print job along with the IP address extracted at Step S800 out of the available terminal information registered in the receiving and setting unit 230. The job management unit 280 then determines whether an e-mail address is registered in the identified available terminal information (Step S860). If the answer is No at Step S860, the job management unit 280 deletes the print job associated with the IP address extracted at Step S800 from the output data management unit 240 (Step S870), and ends the processing. If the answer is Yes at Step S860, the job management unit 280 transmits a notice that a print job not yet output exists along with hypertext data inquiring whether the user will delete the print job to the above-described e-mail address via e-mail (Step S880), and ends the processing.

The second embodiment describes an example in which the output data for settings includes the payment information, however, the embodiment is not limited to this example. The output data for settings may not include the payment information, for another example, in which the image processing apparatus 200 has the payment information reference unit 26 like in the first embodiment.

Embodiments have been described as above, however, the scope of the invention is not limited to the specific structure of the components, the processing, the procedure of operations, the data format used, and the communication protocol used described above.

For example, in the above-described embodiment, the registration server 10 (100) is independent from the image processing apparatus 20 (200). The registration server 10 (100) may be, however, integrated with the image processing apparatus 20 (200). By contrast, the functions in the registration server 10 (100) and the image processing apparatus 20 (200) may be provided so as to be divided into a greater number of apparatuses. Furthermore, a floor-standing terminal may be employed instead of the portable terminal 30 (300), which makes it difficult to hold a screen on the floor-standing terminal over the reading unit 25 (250) of the image processing apparatus 20 (200) though.

The communication between the terminal and the registration server 10 (100) is not limited to a wireless communication. A wired communication may be employed.

Two or more terminals may be used and two or more image processing apparatuses 20 (200) may be used obviously. In this example, a terminal may be registered in two or more image processing apparatuses 20 (200) using one piece of the output data for settings.

As described above, the image processing apparatus 20 (200) may output, upon the request by the terminal, the output data for displaying an image or projecting an image in addition to printing. In this example, upon the request of the output, the terminal may use an application program appropriate for displaying an image or projecting an image, if any, but not limited thereto. The image processing apparatus that has received the output data through the driverless printing application may interpret the print request as a display request or a projection request to execute the operation according to the request. Furthermore, the image processing apparatus may execute a plurality of operations combined among the operations for printing, displaying, and projection.

In the embodiments, an example is described in which the image processing apparatus 20 executes printing after accumulating the received output data from the portable terminal 30. The embodiment, however, is not limited to this example. If the answer is Yes at Step S46 illustrated in FIG. 8, the processing at Step S65 and further illustrated in FIG. 9 may be executed immediately. Specifically, printing according to the received output data may be executed without checking the user by reading the code symbol. This may be applied to the second embodiment as well.

It is to be understood that the structure of the embodiments, examples of operations and modifications described above may be executed arbitrarily combined with each other as long as they are compatible with each other.

With the structure as describes above, when a user uses an output device using a terminal, the user can enable the output device to perform user authentication with a simple operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An output system comprising:
an image processing apparatus; and
a server connectable to a terminal device via a network, the terminal device requesting the image processing apparatus to output an image, wherein the server includes a controller configured to control:
a first identification information obtaining unit configured to obtain, from the terminal device, identification information for identifying the terminal device;
an identification information registration unit configured to register the identification information obtained by the first identification information obtaining unit when a request to register the identification information is received from the terminal device;
a generating unit configured to generate output data for settings for outputting the image, the output data for settings including the identification information of the terminal device registered by the identification information registration unit; and
a transmission unit configured to transmit the output data for settings generated by the generating unit to the terminal device, wherein the image processing apparatus includes a controller configured to control:

a second identification information obtaining unit configured to obtain the identification information from the terminal device;
a receiving unit configured to receive data relating to output of the image from the terminal device from which the second identification information obtaining unit obtains the identification information;
a determination unit configured to, when the data received by the receiving unit includes the output data for settings, determine whether the identification information obtained by the second identification information obtaining unit is equal to the identification information included in the output data for settings;
an available terminal registration unit configured to register the terminal device as an available terminal device, if the determination unit determines that the identification information obtained by the second identification information obtaining unit is equal to the identification information included in the output data for settings; and
an output control unit configured to control an output process according to the data received by the receiving unit from the terminal device registered as the available terminal by the available terminal registration unit.

2. The output system according to claim 1, wherein
the output data for settings to be transmitted by the transmission unit to the terminal device includes a predetermined identifier, and
if the output data includes the predetermined identifier, the determination unit determines that the output data received from the terminal device by the second identification information obtaining unit is the output data for settings.

3. The output system according to claim 1, wherein
the identification information registration unit receives payment information in addition to the request to register from the terminal device and registers the payment information in association with the identification information, and
when the second identification information obtaining unit receives the output data from the terminal device, the output control unit controls the output process according to the data received by the receiving unit to output the output data received within a limitation according to the payment information registered in association with the identification information in the identification information registration unit.

4. The output system according to claim 1, wherein
the identification information registration unit receives information on terms of use specifying a limitation of output in addition to the request to register from the terminal device,
the output data for settings to be transmitted by the transmission unit to the terminal device includes the information on terms of use received,
when registering the terminal device as the available terminal, the available terminal registration unit registers the information on terms of use included in the output data for settings received during registration, in association with the identification information, and
when the second identification information obtaining unit receives the output data from the terminal device, the output control unit controls the output process according to the data received by the receiving unit to output the output data received within a limitation according to the information on terms of use registered in association with the identification information in the available terminal registration unit.

5. The output system according to claim 1, wherein
the identification information registration unit receives setting information representing settings used for output in addition to the request to register from the terminal device,
the output data for settings to be transmitted by the transmission unit to the terminal device includes the setting information received,
when registering the terminal device as the available terminal, the available terminal registration unit registers the setting information included in the output data for settings received during registration, in association with the identification information, and
when the second identification information obtaining unit receives the output data from the terminal device, the output control unit controls the output process according to the data received by the receiving unit to output the output data received using the settings represented by the setting information registered in the available terminal registration unit in association with the identification information.

6. The output system according to claim 1, further comprising:
an image reading unit, wherein the output data for settings includes data of an image representing the identification information,
the output control unit temporarily stores the output data to be output by the output process according to the data received by the receiving unit, in association with the identification information of the terminal device, and
when the image reading unit reads the image representing the identification information, the output control unit controls the output process to output the output data stored in association with the identification information.

7. The output system according to claim 1, wherein the output data is data in a portable document format (PDF) or in a joint photographic experts group (JPEG) format.

8. The output system according to claim 1, wherein the terminal device is a wireless portable user device.

* * * * *